(12) United States Patent
Meisenholder et al.

(10) Patent No.: US 11,404,056 B1
(45) Date of Patent: Aug. 2, 2022

(54) REMOTELESS CONTROL OF DRONE BEHAVIOR

(71) Applicant: Snap Inc., Santa Monica, CA (US)

(72) Inventors: David Meisenholder, Manhattan Beach, CA (US); Steven Horowitz, Pacific Palisades, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 15/640,143

(22) Filed: Jun. 30, 2017

Related U.S. Application Data

(60) Provisional application No. 62/357,231, filed on Jun. 30, 2016.

(51) Int. Cl.
| | |
|---|---|
| *G10L 15/25* | (2013.01) |
| *G10L 17/00* | (2013.01) |
| *G10L 15/22* | (2006.01) |
| *G10L 15/24* | (2013.01) |
| *G05D 1/00* | (2006.01) |

(52) U.S. Cl.
CPC ............ *G10L 15/22* (2013.01); *G05D 1/0016* (2013.01); *G10L 15/24* (2013.01); *G10L 15/25* (2013.01); *G10L 17/005* (2013.01); *B64C 2201/12* (2013.01); *B64C 2201/127* (2013.01); *G10L 2015/223* (2013.01)

(58) Field of Classification Search
CPC .......... B64C 2201/127; B64C 2201/12; G10L 15/25; G10L 17/005
See application file for complete search history.

(56) References Cited

U.S. PATENT DOCUMENTS

| | | |
|---|---|---|
| 6,038,295 A | 3/2000 | Mattes |
| 6,819,982 B2 | 11/2004 | Doane |
| 6,980,909 B2 | 12/2005 | Root et al. |
| 7,173,651 B1 | 2/2007 | Knowles |
| 7,411,493 B2 | 8/2008 | Smith |
| 7,535,890 B2 | 5/2009 | Rojas |
| 7,542,073 B2 | 6/2009 | Li et al. |
| 7,971,156 B2 | 6/2011 | Albertson et al. |
| 8,131,597 B2 | 3/2012 | Hudetz |

(Continued)

FOREIGN PATENT DOCUMENTS

| | | |
|---|---|---|
| CA | 2887596 A1 | 7/2015 |

OTHER PUBLICATIONS

US 10,656,660 B1, 05/2020, Meisenholder et al. (withdrawn)
(Continued)

*Primary Examiner* — Bryan S Blankenagel
(74) *Attorney, Agent, or Firm* — Schwegman Lundberg & Woessner, P.A.

(57) ABSTRACT

A drone system is configured to capture an audio stream that includes voice commands from an operator, to process the audio stream for identification of the voice commands, and to perform operations based on the identified voice commands. The drone system can identify a particular voice stream in the audio stream as an operator voice, and perform the command recognition with respect to the operator voice to the exclusion of other voice streams present in the audio stream. The drone can include a directional camera that is automatically and continuously focused on the operator to capture a video stream usable in disambiguation of different voice streams captured by the drone.

14 Claims, 20 Drawing Sheets

(56) References Cited

U.S. PATENT DOCUMENTS

| | | |
|---|---|---|
| 8,174,562 B2 | 5/2012 | Hartman |
| 8,199,747 B2 | 6/2012 | Rojas et al. |
| 8,274,550 B2 | 9/2012 | Steuart |
| 8,332,475 B2 | 12/2012 | Rosen et al. |
| 8,718,333 B2 | 5/2014 | Wolf et al. |
| 8,724,622 B2 | 5/2014 | Rojas |
| 8,874,677 B2 | 10/2014 | Rosen et al. |
| 8,909,679 B2 | 12/2014 | Root |
| 8,995,433 B2 | 3/2015 | Rojas |
| 9,040,574 B2 | 5/2015 | Wang et al. |
| 9,055,416 B2 | 6/2015 | Rosen et al. |
| 9,100,806 B2 | 8/2015 | Rosen et al. |
| 9,100,807 B2 | 8/2015 | Rosen et al. |
| 9,191,776 B2 | 11/2015 | Root et al. |
| 9,204,252 B2 | 12/2015 | Root |
| 9,225,897 B1 | 12/2015 | Sehn et al. |
| 9,276,886 B1 | 3/2016 | Samaranayake |
| 9,344,642 B2 | 5/2016 | Niemi et al. |
| 9,345,711 B2 | 5/2016 | Friedhoff |
| 9,443,227 B2 | 9/2016 | Evans et al. |
| 9,471,059 B1* | 10/2016 | Wilkins .............. G05D 1/0016 |
| 9,489,661 B2 | 11/2016 | Evans et al. |
| 9,489,937 B1* | 11/2016 | Bear .............. G10K 11/1782 |
| 9,491,134 B2 | 11/2016 | Rosen et al. |
| 9,576,369 B2 | 2/2017 | Venkataraman et al. |
| 9,589,448 B1* | 3/2017 | Schneider .......... G08B 25/016 |
| 9,681,046 B2 | 6/2017 | Adsumilli et al. |
| 9,705,831 B2 | 7/2017 | Spiegel |
| 9,723,272 B2 | 8/2017 | Lu et al. |
| 9,742,713 B2 | 8/2017 | Spiegel et al. |
| 9,747,901 B1 | 8/2017 | Gentry |
| 9,922,659 B2 | 3/2018 | Bradlow et al. |
| 9,989,965 B2 | 6/2018 | Cuban et al. |
| 10,061,328 B2 | 8/2018 | Canoy et al. |
| 10,102,423 B2 | 10/2018 | Shaburov et al. |
| 10,140,987 B2 | 11/2018 | Erickson et al. |
| 10,168,700 B2 | 1/2019 | Gordon et al. |
| 10,284,508 B1 | 5/2019 | Allen et al. |
| 10,439,972 B1 | 10/2019 | Spiegel et al. |
| 10,501,180 B2 | 12/2019 | Yu |
| 10,509,466 B1 | 12/2019 | Miller et al. |
| 10,514,876 B2 | 12/2019 | Sehn |
| 10,614,855 B2 | 4/2020 | Huang |
| 10,748,347 B1 | 8/2020 | Li et al. |
| 10,768,639 B1 | 9/2020 | Meisenholder et al. |
| 10,958,608 B1 | 3/2021 | Allen et al. |
| 10,962,809 B1 | 3/2021 | Castañeda |
| 10,996,846 B2 | 5/2021 | Robertson et al. |
| 10,997,787 B2 | 5/2021 | Ge et al. |
| 11,012,390 B1 | 5/2021 | Al Majid et al. |
| 11,030,454 B1 | 6/2021 | Xiong et al. |
| 11,036,368 B1 | 6/2021 | Al Majid et al. |
| 11,062,498 B1 | 7/2021 | Voss et al. |
| 11,087,728 B1 | 8/2021 | Canberk et al. |
| 11,092,998 B1 | 8/2021 | Castañeda et al. |
| 11,106,342 B1 | 8/2021 | Al Majid et al. |
| 11,126,206 B2 | 9/2021 | Meisenholder et al. |
| 11,143,867 B2 | 10/2021 | Rodriguez, II |
| 11,169,600 B1 | 11/2021 | Canberk et al. |
| 11,227,626 B1 | 1/2022 | Krishnan Gorumkonda et al. |
| 2007/0250526 A1 | 10/2007 | Hanna |
| 2008/0255842 A1* | 10/2008 | Simhi .............. G10L 25/78 704/246 |
| 2009/0122133 A1 | 5/2009 | Hartman |
| 2011/0202598 A1 | 8/2011 | Evans et al. |
| 2012/0194420 A1 | 8/2012 | Osterhout et al. |
| 2012/0209924 A1 | 8/2012 | Evans et al. |
| 2012/0281885 A1* | 11/2012 | Syrdal .............. G10L 17/24 382/116 |
| 2012/0287274 A1* | 11/2012 | Bevirt .............. H04N 7/185 348/144 |
| 2013/0056581 A1* | 3/2013 | Sparks .............. B64C 1/40 244/1 N |
| 2013/0238168 A1 | 9/2013 | Reyes |
| 2014/0254896 A1* | 9/2014 | Zhou .............. G05D 1/0278 382/124 |
| 2015/0022432 A1 | 1/2015 | Stewart et al. |
| 2015/0070272 A1 | 3/2015 | Kim et al. |
| 2015/0175263 A1 | 6/2015 | Reyes |
| 2015/0199022 A1 | 7/2015 | Gottesman et al. |
| 2015/0287246 A1 | 10/2015 | Huston et al. |
| 2015/0331490 A1* | 11/2015 | Yamada .............. G06F 3/017 345/156 |
| 2015/0362917 A1* | 12/2015 | Wang .............. G05D 1/0022 701/2 |
| 2016/0063987 A1* | 3/2016 | Xu .............. G10K 11/1784 381/71 |
| 2016/0161946 A1* | 6/2016 | Wuth Sepulveda . G05D 1/0022 701/2 |
| 2016/0179096 A1* | 6/2016 | Bradlow .............. B64C 19/00 701/8 |
| 2016/0292886 A1* | 10/2016 | Erad .............. H04N 5/23206 |
| 2016/0307573 A1* | 10/2016 | Wobrock .............. H04N 5/232 |
| 2016/0336020 A1 | 11/2016 | Bradlow et al. |
| 2017/0031369 A1 | 2/2017 | Liu et al. |
| 2017/0094259 A1 | 3/2017 | Kouperman et al. |
| 2017/0099424 A1* | 4/2017 | Jones .............. G05D 1/0094 |
| 2017/0102699 A1 | 4/2017 | Anderson |
| 2017/0177925 A1 | 6/2017 | Volkart |
| 2017/0225796 A1* | 8/2017 | Sun .............. H01L 23/467 |
| 2017/0228690 A1* | 8/2017 | Kohli .............. G06Q 10/0832 |
| 2017/0244937 A1* | 8/2017 | Meier .............. H04N 5/23216 |
| 2017/0337791 A1* | 11/2017 | Gordon-Carroll ...... H04L 67/12 |
| 2017/0371353 A1* | 12/2017 | Millinger, III ......... G05D 1/101 |
| 2018/0082682 A1 | 3/2018 | Erickson et al. |
| 2018/0246529 A1 | 8/2018 | Hu et al. |
| 2019/0011921 A1* | 1/2019 | Wang .............. G05D 1/12 |
| 2020/0241575 A1 | 7/2020 | Meisenholder et al. |
| 2021/0011612 A1 | 1/2021 | Dancie et al. |
| 2021/0074016 A1 | 3/2021 | Li et al. |
| 2021/0166732 A1 | 6/2021 | Shaburova et al. |
| 2021/0241529 A1 | 8/2021 | Cowburn et al. |
| 2021/0303075 A1 | 9/2021 | Cowburn et al. |
| 2021/0303077 A1 | 9/2021 | Anvaripour et al. |
| 2021/0303140 A1 | 9/2021 | Mourkogiannis |
| 2021/0382503 A1 | 12/2021 | Meisenholder et al. |
| 2021/0382564 A1 | 12/2021 | Blachly et al. |
| 2021/0397000 A1 | 12/2021 | Rodriguez, II |

OTHER PUBLICATIONS

Pourmehr, S., Monajjemi, V. M., Vaughan, R., & Mori, G. (Nov. 2013). "You two! Take off!": Creating, modifying and commanding groups of robots using face engagement and indirect speech in voice commands. In 2013 IEEE/RSJ International Conference on Intelligent Robots and Systems (pp. 137-142). IEEE.*

"U.S. Appl. No. 15/640,061, Advisory Action dated May 28, 2019", 3 pgs.

"U.S. Appl. No. 15/640,061, Examiner Interview Summary dated May 14, 2019", 3 pgs.

"U.S. Appl. No. 15/640,061, Final Office Action dated Apr. 2, 2019", 44 pgs.

"U.S. Appl. No. 15/640,061, Non Final Office Action dated Dec. 28, 2018", 37 pgs.

"U.S. Appl. No. 15/640,061, Notice of Allowance dated Jan. 13, 2020", 7 pgs.

"U.S. Appl. No. 15/640,061, Notice of Allowance dated Jun. 11, 2019", 7 pgs.

"U.S. Appl. No. 15/640,061, Notice of Allowance dated Sep. 24, 2019", 7 pgs.

"U.S. Appl. No. 15/640,061, Response filed Mar. 11, 19 to Non Final Office Action dated Dec. 28, 2018", 14 pgs.

"U.S. Appl. No. 15/640,061, Response filed May 16, 19 to Final Office Action dated Apr. 2019", 13 pgs.

Laput, Gierad, et al., "PixelTone: A Multimodal Interface for Image Editing", ACM, Proceedings of the SIGCHI Conference on Human Factors in Computing Systems, Paris, FR, (2013), 10 pgs.

Leyden, John, "This SMS will self-destruct in 40 seconds", [Online] Retrieved from the Internet: <URL: http://www.theregister.co.uk/2005/12/12/stealthtext/>, (Dec, 12, 2005), 1 pg.

(56) References Cited

OTHER PUBLICATIONS

"U.S. Appl. No. 15/640,061, Notice of Allowance dated May 26, 2020", 7 pgs.
"U.S. Appl. No. 16/846,575, Non Final Office Action dated Mar. 8, 2021", 11 pgs.
"U.S. Appl. No. 16/846,575, Response filed May 7, 2021 to Non Final Office Action dated Mar. 8, 2021", 9 pgs.
"U.S. Appl. No. 16/846,575, Notice of Allowance dated May 21, 2021", 8 pgs.
U.S. Appl. No. 17/410,019, filed Aug. 24, 2021, Motion and Image-Based Control System.

* cited by examiner

REMOTELESS CONTROL OF DRONE BEHAVIOR

PRIORITY CLAIM

This application claims the benefit of priority to U.S. Provisional Patent Application Ser. No. 62/357,231, filed on Jun. 30, 2016, the benefit of priority of each of which is claimed hereby, and each of which is incorporated by reference herein in its entirety.

BACKGROUND

This disclosure relates to unmanned aerial vehicles (UAVs), commonly known and also referred to herein as aerial drones, or simply as drones. At least some embodiments of the disclosure provides for drones that are sized for ready portability and use by a single person, being configured for relatively low-level flight within comfortable viewing range of persons at ground level. The term personal drone is occasionally used herein to refer to such devices.

Many existing personal drones are controlled by a dedicated wireless remote control device, which can require considerable skill and practice for effective operation. Such drones are moreover not usable without the remote control device, requiring a user to carry and have at hand not only the drone, but also the remote control device.

BRIEF DESCRIPTION OF THE DRAWINGS

Various ones of the appended drawings merely illustrate example embodiments of the present disclosure and cannot be considered as limiting its scope.

Figure 1:
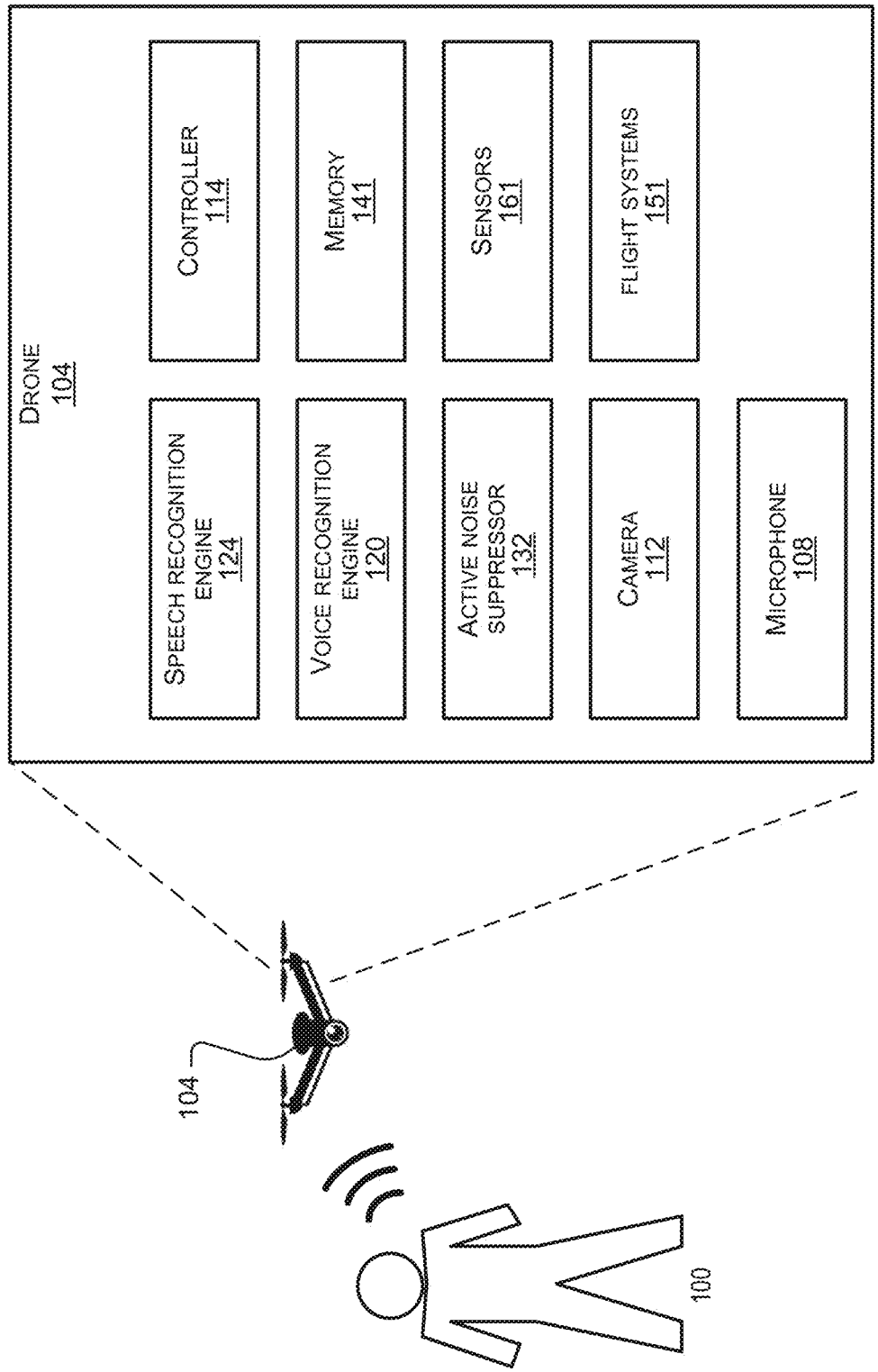
FIG. 1 is a schematic diagram illustrating a drone system with voice-control functionality, according to some example embodiments.

The headings provided herein are merely for convenience and do not necessarily affect the scope or meaning of the terms used.

DESCRIPTION

The description that follows includes devices, systems, methods, techniques, instruction sequences, and computing machine program products that embody illustrative embodiments of the disclosure. In the following description, for the purposes of explanation, numerous specific details are set forth in order to provide an understanding of various embodiments of the disclosed subject matter. It will be evident, however, to those skilled in the art, that embodiments of the disclosed subject matter may be practiced without these specific details. In general, well-known instruction instances, protocols, structures, and techniques are not necessarily shown in detail.

Voice Control of Drone Behavior

One aspect of the disclosure provides a method of and a system for voice-controlled operation of a drone. Some embodiments thus provide for a drone or a drone system configured to receive a voice command issued by a user, to identify a particular predefined drone function corresponding to the voice command, and to execute the commanded function.

In some embodiments, the drone is camera-enabled, with at least some functions of an onboard camera being controllable by user-issued voice commands. These voice-controllable camera functions may include switching the camera between respective modes for capturing videos or photos (i.e., still images); triggering or stopping image capture, and identifying a focus object or person.

Instead, or in addition, at least some of the voice commands control movement and/or positioning of the drone. Thus, for example, the drone may be configured to automatically change its altitude responsive to user-issued voice commands. In some embodiments, voice-controlled altitude commands may be relative to the drone's current position, for example comprising commands for the drone to move up or down. The drone may automatically move upwards or downwards a predefined distance responsive to such a command to change its altitude. In some embodiments, the user may specify by voice command a distance by which the drone is to change its altitude. Thus, for example, the user may verbally command the drone to "go up 5 feet," responsive to which the drone automatically executes the specified command. Instead, or in addition, the drone may be configured to process and respond to voice command specifying a particular altitude at which the drone is to operate. Thus, for example, the user may verbally command the drone to "go to 10 feet," to responsive to which the drone automatically changes its altitude to hover at 10 feet from the ground surface.

In some embodiments, the drone is configured automatically to center on and track a particular user identified as operator of the drone. In some embodiments, the drone is configured to automatically maintain a substantially constant distance between itself and the operator. The drone will in such cases follow the identified operator at a substantially constant tracking radius. The tracking radius may have a preset or default value, which may in some embodiments be selectively variable by the user. In the presently discussed example embodiment, the tracking radius may be variable by voice command. Thus, the tracking radius may for example be variable responsive to operator-issued voice commands to come closer or to go further.

In some example embodiments, an automated user tracking mode such as that described above may be triggered on the fly, for example by voice command. The drone can in such embodiments be commanded in-flight by a spoken tracking command (e.g., "follow me"), responsive to which the drone camera is automatically focused on the operator. When the operator thereafter moves around, the drone autonomously keeps operator within the scene captured by the camera and also autonomously moves to keep the distance between the operator and the drone constant.

Note that in the above-described embodiment, there are two aspects to auto-following, namely (a) following the operator physically and a constant distance, and (b) keeping the operator within the scene captured by the camera. These aspects can in different embodiments be implemented separately, or in combination.

In some embodiments, the predefined voice commands include a homing command responsive to which the drone automatically returns to a specific homing location. The homing location corresponds in some embodiments to the current location of the operator, which may in some instances be recognized by automated image processing (e.g., object recognition or facial recognition) performed with respect to real-time image data captured by the drone. Instead, or in addition, the homing location may be indicated by a homing beacon or by automatic identification by the drone of a last launch location of the drone.

In some embodiments, reception of voice commands is via an onboard microphone incorporated in the drone. The drone may in such cases be configured automatically to discriminate between different voices that may be present in an audio stream picked up by the drone microphone, to select a particular one of the voices as an operator voice, and to execute voice-triggered functions exclusively responsive to commands issued in the selected operator voice.

In one example embodiment, the drone is configured to automatically select the operator voice based on automated voice recognition. A voice signature or set of voice characteristics may in such embodiments be associated with the current operator of the drone, with an audio stream received by the drone microphone being compared with the pre-established voice signature to extract from the audio stream spoken commands issued by the operator. In such embodiments, a user interface mechanism for the drone may provide preflight functionality for setting or changing the identity and concomitant voice signature of the operator.

In some embodiments, the drone is configured to select the operator voice on the fly, enabling in-flight mobile control of the drone without preflight designation of a particular user as the operator. In some such embodiments, the operator voice may be selected based on voice loudness, as represented in the drone's audio stream. In particular, the loudest received voice is in some embodiments automatically selected as the operator voice to which the drone responds exclusively.

In some embodiments, operator voice selection is based on identifying a voice source closest to the drone. This can in some embodiments be achieved by determining a respective source location for each of a plurality of voices in the audio stream, and selecting as operator voice that voice which corresponds to the voice source closest to the drone.

In some embodiments, identifying voice source location is based on processing synchronized audio streams from a plurality of spaced microphones, thereby to triangulate respective source locations for different voices represented in the audio streams. The plurality of microphones may include two or more microphones selected from the group comprising: (a) one or more microphones carried by the drone, (b) respective microphones carried by one or more other drones within audio range, (c) a microphone incorporated in a mobile electronic device (such as a mobile phone) carried, for example, by the operator, and (d) a dedicated drone-control microphone separate from and communicatively coupled with the drone.

Another aspect of the disclosure provides for automated identification of an operator of a drone by processing a video stream captured by an onboard camera of the drone, automatically to identify as operator a particular one of a plurality of persons captured in the video stream. Such identification may comprise automated facial recognition, object recognition (e.g., to recognize a predefined visual identifier associated with the operator), or automated feature recognition to identify a distinctive visual feature (e.g., a particular color of clothing or visually distinctive object such as a control wand or wristband) associated with the operator. In one example embodiment, for instance, the drone is configured automatically to identify, upon manual launch, a person performing the launch as the operator, to identify at least one distinctive visual feature of the operator (e.g., a distinctly colored article of clothing worn by the operator), and thereafter automatically to track the operator based on automated recognition of the distinctive visual feature.

Note that while video-based operator identification such as that described above can in some embodiments be performed to facilitate voice control of the drone, other embodiments can instead or in addition provide for video-based operator identification to facilitate other modes of drone control. In one such embodiment, the drone may be controllable by hand, body, and/or facial gestures of the operator. In such cases, on-the-fly identification and targeting of the person designated as operator of the drone (to the exclusion of such other persons as may be present) serves to ensure that the drone camera is substantially continually trained on the operator. This ameliorates interruptions in gesture control caused by failing to capture some control gestures in the video stream. Automated video-based operator identification further lessens the likelihood of inadvertent switching of operator or hijacking of gesture control of the drone by others.

As mentioned, operator voice identification or selection in some embodiments comprises processing of the audio stream with a synchronized video stream. Voice identification based in part on processing of the video stream may comprise automatically recognizing facial speech movements by the operator, and identifying as operator-issued commands or as the operator voice those vocal components of the audio stream that are synchronous with the automatically recognized facial speech movements of the operator. In other words, the drone may in such embodiments be configured to identify the operator visually, and to match a particular voice in the audio stream to the operator based on synchronicity of the particular voice with corresponding visually identified speech by the identified operator.

The capture of image information or a video stream employed for such voice discrimination purposes may in some embodiments be performed using an auxiliary camera incorporated in the drone in addition to its primary camera. The auxiliary camera may in some embodiments be configured and oriented to substantially continually capture a video stream in which the operator is visible. In one example embodiment, the auxiliary camera is a wide angled camera, for example having a viewing angle of greater than 150° in two orthogonal directions. The viewing angles of the auxiliary camera may in some embodiments be approximately 180°, or greater. In a particular example embodiment, such a wide angled auxiliary camera is mounted on an operatively lower side of a drone body, so that the auxiliary camera effectively captures visual information on everything lower than the level of the drone in flight. In some embodiments, two or more auxiliary camera is may be provided to capture video imagery for operator identification. In one embodiment, wide-angled cameras may be positioned on opposite sides of the drone body, for example to capture video at composite viewing angles of substantially 360° in both orthogonal directions.

The auxiliary camera may be fixedly mounted on the drone body, to have a fixed orientation relative to the drone body. Instead, the auxiliary camera may be movably mounted on the drone body, the drone including an automated tracking system configured to dynamically move the auxiliary camera so as to track the person and/or the face of the operator. The auxiliary camera is in such embodiments locked on to the face or person of the operator, and remains focused on the operator regardless of the movement of the drone. Such automated tracking may be achieved in some embodiments by automated facial and/or object recognition based on the video stream captured by the auxiliary camera itself. In other embodiments, the operator may be tracked based on a beacon device carried by the operator and/or based on location information automatically communicated from a mobile user device (e.g., a mobile phone enabled with local/global positioning system functionality) to the drone by means of a communication link between the mobile device and the drone.

In some embodiments, the onboard microphone of the drone may be a unidirectional microphone movably mounted on the drone body. A unidirectional microphone is primarily sensitive to sounds from a particular direction. Such a unidirectional microphone may in some embodiments comprise a shotgun microphone or a parabolic microphone. The drone may in such cases include a microphone directing system configured automatically to point the microphone towards the designated or identified operator. In operation, the directional microphone is thus constantly directed towards the operator, so that an audio stream captured by the directional microphone includes essentially no significant voice stream other than that of the operator. In some such instances, speech command recognition may be performed without voice discrimination or recognition, as described previously. Automated tracking of the operator location, in order to achieve continuous pointing of the directional microphone at the operator, may in some embodiments be performed based on automated image processing as described elsewhere herein.

Instead of or in addition to capturing audio for speech control purposes, the system may in some embodiments include an offboard microphone separate from the drone to capture audio streams containing spoken operator commands. The offboard microphone may be a portable microphone to be carried by the user.

In some embodiments, the offboard microphone is a special-purpose microphone dedicated for operation with the drone, for example being provided with the drone as part of a drone kit. In such cases, the special-purpose offboard microphone may serve as an audio remote control device for the drone. Such an audio remote control device may in some embodiments be a solitary or exclusive remote control device forming part of the drone kit. In other embodiments, the offboard microphone may be provided for spoken remote control in addition to another remote control device, such as a haptic remote control. In some embodiments, the offboard microphone may be incorporated in a haptic remote control device by which at least some functions of the drone may be controlled through operation of conventional toggles, buttons, bumpers, control sticks, and the like.

The offboard microphone is in each of these cases communicatively coupled to the drone, for real-time communication of operator commands to the drone. In some embodiments, audio processing for identifying spoken commands is performed exclusively at the drone by one or more onboard processors. In other embodiments, the audio processing is performed exclusively by offboard processors physically separate from the drone and communicatively coupled to the drone. In yet further embodiments, an audio processing load may be shared between offboard and onboard processors. The offboard processors may in some embodiments be incorporated in a device carrying the offboard microphone. As will be described below, the offboard microphone is in some instances provided by a mobile phone of the operator, in which case a part or all of the audio processing functions may be performed by the mobile phone.

As mentioned, audio stream capturing for voice control purposes is in some embodiments performed by use of a native microphone integrated in a mobile phone of the user. The mobile phone may in such instances execute an application for enabling operator control of the drone via the mobile phone. Note that at least some of the functions described previously with respect to the drone's onboard microphone (such as automated voice identification and speech recognition) may in such cases be performed with respect to an audio stream captured by the mobile phone microphone.

The mobile phone may instead or in addition be configured by the drone control application executed thereon to capture image data of the operator via a native camera incorporated in the phone, and to identify and execute spoken commands based at least in part on the image data.

For example, voice and/or speech recognition may be based at least in part on an audio stream and/or a video stream captured by the mobile phone (e.g., in some embodiments where synchronized image processing and audio processing is employed), to match captured speech to corresponding mouth movements of the operator.

Autonomous in-Flight Behavior

Some aspects of the disclosure relates to autonomous in-flight behavior of an aerial drone. One aspect of such autonomous behavior may in some embodiments include autonomous flight behavior. A drone control system is in such embodiments be configured to automatically control at least some aspects of in-flight positioning and/or flight patterns performed by the drone.

Aspects of autonomous behavior that are disclosed herein include (a) partially or fully autonomous flight, and (b) partially or fully autonomous image framing and/or capture. Although these aspects are in some instances described separately in the description that follows, it should be noted that some embodiments may employ both of these autonomous behaviors, while they may in other embodiments be used separately. For example, a disclosed selfie drone, as described elsewhere herein, is programmed or configured to display both autonomous flight and autonomous image-capture, in that it is configured responsive to launch to fly autonomously to a suitable position for capturing an image of an operator of the drone, autonomously to frame and capture an image of the operator, and to return autonomously to the operator. Example embodiments that include autonomous camera behavior but not autonomous flight includes a conventionally operated drone that is configured autonomously to select framing and/or timing of image capturing by an onboard camera. In contrast, an embodiment in which, for example, the drone is configured to follow a specific autonomous flightpath responsive to a particular launch commanded by the operator (e.g., launching the drone with a specific rotation), can in some instances be performed without employing autonomous camera behavior.

As mentioned, autonomous drone behavior may be fully autonomous or partially autonomous. With partially autonomous behavior is meant that the relevant in-flight activity is to some extent autonomous, while being triggered or to some extent controlled by operator commands received in-flight. For example, partially autonomous flight behaviors include: the previously described feature of the drone being configured to track the operator responsive to an in-flight "FOLLOW ME" command; the performance of a specified flight pattern responsive to an in-flight voice or gesture command; and automatically returning to the operator responsive to a homing command. Partially autonomous camera behavior includes, for example, embodiments in which an image is captured responsive to an in-flight command from the operator, but in which the framing of the image and/or the specific instant at which the image is captured is determined in an automated operation.

Autonomous Image Framing and/or Capture

Note that the various features of autonomous image framing and capture as discussed herein may in some embodiments apply only to photographic images, may in other embodiments apply only to video content, and may apply in yet further embodiments to both photos and videos.

In some embodiments, the drone is configured for at least partially autonomous selection and positioning of a vantage point for image-capture. The drone may, for example automatically change its position to optimize or improve picture framing quality. In such embodiments, picture quality assessment may continually or continuously be performed based on predefined picture quality metrics or on predefined image-capture parameters.

In embodiments where the drone is to capture facial images of one or more persons (e.g., based on preprogrammed default behavior or responsive to an operator command), the drone may be configured to automatically capture the targeted face according to parameters relating to shot profile, elevation angle of capture, and/or image composition. The drone can in one example embodiment automatically position itself for capturing a facial picture in one of profile view, front-on view, and oblique front view. Such image capture parameters according to which the drone and/or its camera automatically frames, times, and/or selects a particular image are in some embodiments be default parameters. In some embodiments, the image-capture parameters are reconfigurable by the operator, e.g. by way of a drone user interface.

Some embodiments provide for operator-selection between a plurality of predefined image types defined by a respective set of image capture parameters. Thus, for example, the operator can in some embodiments instruct the drone to capture a front-on facial image, a profile image, a full body shot, or the like, responsive to which the drone automatically frames the scene according to the corresponding set of image-capture parameters. Such image type selection may in some embodiments be performed preflight. Instead, or in addition, the drone is in some embodiments configured to permit in-flight selection of a particular predefined image type. Such in-flight commands may comprise voice commands, gesture commands, or commands utilizing any other suitable in-flight command channel such as the various command channels described herein.

Automated image framing and/or capture may in some embodiments be performed or facilitated by artificial intelligence (AI) or machine learning procedures executed substantially in real-time while the drone is in flight. The drone may in some such embodiments be in communication with one or more offboard processors forming part of an AI system or a machine learning system that has been trained with example images of predefined types.

Predefined image-capture parameters according to which the drone is configured automatically to frame and/or capture a corresponding image type may differ between images of persons and scenic images. Image types for personal images may include (but is not limited to) close-up images (e.g., containing the subject's head and shoulders), medium shots (e.g., framed from the waist up), full shots (e.g., of the person's entire body and face), 2 or 3 group images (e.g., of the operator and the one or two persons closest to the operator in a clustered group), and full group shots (e.g., of an entire group of people that includes the operator and that is visually substantially contiguous, regardless of group size).

The image-capture parameters may in some embodiments include considerations with respect to lighting of the target scene and/or person(s). In one example, the drone is configured automatically to position itself on the best lit side of the targeted subject's face. In such cases, the drone may be configured automatically to perform image recognition on a captured video stream, to identify a target person's face, to compare luminosity values for opposite lateral areas of the identified face, and automatically to change the position of the drone so as to keep the drone on the better lit side of the target's face. In a further example, the image-capture parameters in some embodiments direct that images be captured away from a dominant light source (e.g., an evening or morning sun). Such auto-positioning parameters can in some embodiments be overridden by a countermanding command from the operator.

The-image-capture parameters may in some embodiments include compositional parameters defining one or more metrics or attributes of image composition, based on which autonomous framing of images to be captured is automatically performed. Thus, for example, the drone may be configured automatically to capture a picture or a video clip according to predefined guidelines. In one example embodiment, the compositional parameters define image composition according to the rule of thirds, so that one or more focal points are positioned at a respective intersection of (a) one of two horizontal lines dividing the image in equal horizontal strips and (b) one of two vertical lines dividing the image in equal vertical bands. Facial feature recognition is in some embodiments performed as part of the automated image framing; e.g., to frame the image such that a focal point between a photographed person's eyes is positioned according to the rule of thirds. Other compositional guidelines may include specification of a particular position or range for framing the horizon. It will be appreciated that many different compositional parameters and guidelines may be contemplated. In some embodiments, images are automatically composed according to fixed default parameters. In other embodiments, an operator may select between multiple different sets of compositional parameters or guidelines. Instead, or in addition, some embodiments may provide for operator customization of compositional parameters.

Flightpath and/or Camera Behavior Control Via Launch Metrics

At least some attributes or aspects of autonomous flight and/or scene selection are in some embodiments based at least in part on launch metrics. With launch metrics is meant physical movement and/or orientation values sensed by the drone during launch thereof. e.g., by the manual throwing, tossing, or dropping of the drone. In some embodiments, a flightpath and/or in-flight behavior of the drone is automatically variable responsive to variation in one or more of (a) a launch vector, (b) a launch rotation, and (c) a launch orientation.

Thus, the operator can in some embodiments determine a flightpath distance and/or direction by controlling the distance and/or direction of the vector at which the drone is launched. In some such instances, the launch vector can additionally influence the vantage point from which image-capture is to occur. In one example embodiment, the drone is configured to, responsive to manual launch, autonomously capture an image of the operator (i.e., of the person that launches the drone). In such a selfie mode, the drone may after launch automatically fly out to a particular vantage point, and then frame and capture a selfie image of the operator from the vantage point. The vantage point may be determined at least in part on the size of the launch vector, e.g., on the initial speed at which the drone is manually tossed or thrown. Thus, the vantage point may increase in distance from the operator with an increase in the size of the launch vector. The harder the operator throws the drone in such a case, the further the drone travels before coming to a hovering standstill for capturing an image of the operator. In this manner, the length of the flightpath is determined by the manner in which the flightpath is initiated.

Instead, or in addition, flightpath direction may be determined by the direction of the launch vector. Thus, either or both of an elevation angle and an azimuth angle between the operator and the drone's vantage point (from which an image is to be captured) may in some embodiments be based at least in part on the launch vector direction. In this respect, note that that the elevation angle is an angle lying in a vertical plane (thus defining the height of the drone for a given scalar distance between the operator and the drone), while the azimuth angle is an angle lying in a horizontal plane (thus defining the direction of the drone relative to the operator when seen in overhead view). Any combination of these three attributes (i.e., elevation angle, azimuth angle, and scalar distance from the operator) is contemplated for automated vantage point selection in at least partially automated selfie capturing procedures.

Therefore, in some embodiments, the azimuth angle and the distance from the operator of the vantage point at which the drone settles for capturing a picture is controllable by selection of the size and the azimuth angle of the launch vector, while automated selection of the elevation angle is agnostic as to any attribute of the launch vector. In other embodiments, the elevation angle and the distance from the operator is determined by the elevation angle and size of the launch vector, but the azimuth angle may autonomously be selected by the drone based on image composition, image quality optimization, and/or additional in-flight user commands. In yet other embodiments, only one of these attributes of the vantage point is automatically determined based on the launch vector. A particular example embodiment, for example, provides for autonomous selection by the drone of the elevation angle and the azimuth angle, with only the distance of the drone from the operator being determined by how fast the drone is initially launched by the operator.

Note that the variation of flightpath parameters based on launch vector metrics is described above with reference to the out-and-back selfie flightpath for non-limiting example purposes only, and that different flightpaths or patterns may instead or in addition be dynamically variable in at least some of their attributes based on launch vector metrics.

Another aspect of the invention provide for at least partially automated timing of the capturing of an image by an aerial drone. In some embodiments, automatic or semi-automatic image-capture timing may be based at least in part on a facial attribute of an identified target subject. For example, capture of a photographic image of the target subject may automatically be timed to coincide with the subject's eyes being open. Instead or in addition, image-capture is in some embodiments automatically timed to coincide with the subject's smiling. Benefits of such embodiments include that it improves image quality, in that it avoids or lessens instances in which pictures captured by the drone includes image subjects with their eyes closed and/or where the snapping of a picture is out of synch with the user smiling.

In such an example embodiment, the drone (or one or more computer processors communicatively coupled to the drone) is configured automatically to perform image processing with respect to a video stream, to recognize in the video stream the face of a photo subject, to recognize one or more facial features of the photo subject (e.g., the eyes and/or mouth), to determine respective conditions of the one or more facial features (e.g., eyes open or closed; mouth smiling or non-smiling), and to capture a photographic image when the respective conditions of the one or more facial features satisfy predefined criteria (e.g., the eyes are open, the eyes are trained on the camera, the mouth is smiling, or the like).

Although the example embodiment above is described with reference to facial feature recognition and monitoring of a single person, similar facial expression aspects may in other instances be automatically considered with respect to a plurality of people within an image. Thus, for example, the drone is in one example embodiment programmed or configured to capture a group image only when the eyes of all persons in the group are open, when all of the persons in the group are smiling, and/or when all of the persons in the group are looking at the camera. It will appreciated that the above-discussed facial features automatically assessed for image capture timing are non-exhaustive examples, and that different facial features can automatically be analyzed for such purposes in other embodiments.

As mentioned, automated image-capture timing is in some embodiments fully automated, while in other embodiments be partially automated. With partially automated image-capture is meant that the capture of an image is triggered by an in-flight user commands, but that the particular instant of image capture is automatically selected subsequent to the triggering command. Thus, for example, the operator can throw the drone out to hover at a vantage point for taking a picture, after which the operator commands the drone (e.g., by voice or gesture) to take the picture. Responsive to this command, the drone then performs, for example, facial expression and/or feature monitoring and times capturing of the image based on the facial expression and/or feature monitoring.

In accordance with a further aspect of the disclosure, a drone in accordance with some embodiments has an integrated onboard flashlight for flash illumination of scenes to be captured by an onboard camera of the drone. Such a flash may in some embodiments be a battery-powered flash LED (light emitting diode) or LED array.

Selected Additional Automated Flightpaths

Some embodiment provides for automated flight behavior in which the drone is configured automatically to follow a specific person identified as target person. Such following behavior may include automatically following the target person physically, and/or tracking the target person with an onboard camera of the drone. In one example embodiment, the drone automatically follows the target person such as to maintain a substantially constant radius between the drone and the target person. In such embodiments, the size of the radius (or scalar distance) from the target person may be determined by the size of the launch vector. Thus, when the operator launches the drone pursuant to a "follow me" command, the specific distance at which the drone follows the operator (in such cases being the target person) is determined by how hard the operator throws or tosses the drone at launch.

In another example embodiment, the drone may be configured automatically to hover at a specific location. This flight pattern is also referred to herein as being performed responsive to a "stay" command, the drone remaining in its specified location regardless of subsequent movement of the operator. Specification of the hover location for the drone may in some such embodiments be based at least in part on the launch vector direction and/or size. For example, the operator may indicate the direction of the stay location (in azimuth angle and/or in elevation angle) relative to the operator by means of the direction of the launch vector. Instead, or in addition, the operator may indicate the distance of the stay location from the operator by means of the size of the launch vector. Thus, the faster the operator launches the drone, the further the hover location is from the operator.

A further aspect of flight behavior that is in some embodiments performed autonomously is homing behavior, in which the drone returns to the operator or to a specified homing location. Such return behavior may in some examples be triggered fully autonomously by the drone, e.g., after capturing an image for which it was launched (such as in the selfie-drone example described elsewhere herein), upon approaching battery depletion, upon expiry of a predetermined flight period, or responsive to a similar automatically determined return trigger. In other instances, automatic return to a specific location, object, or person may be responsive to an in-flight command issued by the operator. Such an in-flight return command may be communicated to the drone via any of the command modes discussed in this disclosure, including, for example, a voice command, a gesture command, and a command issued via a multifunctional electronic device such as a mobile phone.

Auto-return of the drone in some embodiments include identification by the drone of the homing location, object, or person. In some embodiments, the drone is configured to identify the homing location based at least in part on the launch vector as determined by accelerometers forming part of the drone. In one example embodiment, the drone is configured automatically to identify), based at least in part on the launch vector, for homing purposes the person manually launching the drone as the operator to whom the drone is to return (and who thus serves as the homing location). The drone may in such embodiments process launch vector metrics to determine a launch location, and may thereafter automatically capture image data at the launch location, whereafter the image data may be processed to automatically identify an object or person that is to serve as a homing location. As described previously, such automated image-based identification may comprise face recognition, and/or identification of one or more distinctive features associated with the identified object/person. Camera features, camera control operations, and image processing may in such embodiments be in accordance with any of the embodiments described previously with respect to auto-tracking of the operator for identification of voice control purposes.

In some embodiments in which the drone is configured to display at least partially automated homing behavior, the homing location, object, or person may explicitly be communicated to the drone by the operator. In one example embodiment, the operator can physically point to a particular person or object, responsive to which that person or object is automatically identified by the drone as the homing location. In one example embodiment, the drone is configured to identify such a physically identified object or person has homing location only when the pointing action by the operator is accompanied by an associated command, which may in some embodiments be issued by voice or by gesture. In other embodiments, a specific gesture performed with respect to a particular object, location, or person may be pre-defined to identify the homing location. For example, a homing location specification gesture in one embodiment comprises circling an open hand palm-down over the location followed by downward movement of the palm on to the selected person, object, or location.

In another example embodiment, identification of the homing location may be by operator input on a viewfinder on the drone or a live preview/feed of drone camera on the display screen of the operator's mobile phone. Thus, in one example embodiment, the operator can, preflight, direct the drone such that the selected homing location is displayed on a viewfinder carried on the drone, and may thereafter select the homing location via the viewfinder, e.g., by haptic selection of the homing location in embodiments in which the drone viewfinder is a touchscreen. Instead, the homing location may in some embodiments be selectable in-flight by user input with respect to a live video feed from the drone via a mobile phone touchscreen.

In yet further embodiments, preflight communication to the drone of the homing location may be by drone gesture, comprising physical manipulation of the drone before launch. For example, tapping a particular person with the drone prior to launch automatically identifies that person as homing location or tracking focus. The drone is configured automatically to identify the tapped person based on image processing of an associated video stream, and subsequently to follow the person thus identified, or to auto-return to that person, as the case may be.

In some embodiments, a particular object or person may be indicated to the drone by the operator as a target object/person for image-capture (further referred to as the photography subject), pursuant to which the drone may automatically position itself for capturing an image of the photography subject, e.g. based on predefined or selected image-capture parameters as described previously.

In some embodiments, a homing location and/or a tracking focus for the drone may be identified by a portable device emitting a beacon signal. Such a beacon device is in some embodiments configured to emit a wireless electromagnetic beacon signal, for example comprising an infrared beacon signal. In other embodiments, the beacon may emit light in the visible spectrum. Such a light beacon may in some embodiments provide a steady light source at a particular wavelength. Instead, the light beacon may produce a signal comprising, for example, a series of flashes or a color sequence. In embodiments where a light beacon is employed, the drone may be configured to process a video stream captured by an onboard camera to identify and interpret the beacon signal within the video stream.

In other embodiments, the drone is configured to produce a sonic beacon signal, e.g., comprising an ultrasonic signal. In yet further embodiments, the beacon signal may be emitted by a multifunctional mobile device, such as a mobile phone on which is executed software for producing the beacon signal.

It will be appreciated that the drone will, in any of the discussed embodiments that includes production of the beacon signal, have corresponding onboard sensors sensitive to the respective type of beacon signal, with one or more computer processors in communication with the sensors being configured or programmed to process data signals received from the sensors, to identify the location of the beacon signal and to navigate towards its source.

Another aspect of the disclosure provides for automated flight by the drone to follow a predefined flightpath. Previously described example embodiments of such flightpaths include an automated selfie flightpath (in which the drone after launch flies out to a vantage point, captures an image of the operator, and returns to the operator), an automated follow flightpath (in which the drone automatically follows the operator, e.g. at a constant radius from the operator), and an auto-stay flightpath (in which the drone after launch flies out to a hover point and remains stationary at the hover point until. e.g., receiving a different command). Instead, or in addition, the drone may in some embodiments be configured to perform an automated fly-around flightpath, in which the drone follows a horizontal arc around a focus point (e.g., the operator or launcher). The arc in some embodiments comprises a full rotation, so that the drone flies substantially 360° around the focus point. The drone may additionally be configured automatically to return to the operator after performing the fly-around subsequent to launch. The drone can in one example embodiment automatically capture a video clip during the fly-around, or may in some embodiments automatically capture a sequence of digital images during the fly-around. Such image-capture is in some embodiments automatically focused on the operator.

Instead, or in addition, the drone is in some embodiments configured to perform an automated flyover, in which the drone follows an arc in an upright plane around a focus point (e.g., the operator). The flyover arc is in some embodiments a full flyover, so that drone flies substantially 180° around the focus point. Automated return behavior and image-capture behavior of the drone may be similar to that described above with reference to the fly-around flightpath.

A further example automated flightpath that can be executed by the drone in some embodiments includes an overhead shot, in which the drone automatically flies to a vantage point substantially vertically above the operator, and captures an image from the overhead vantage point. As in previous embodiments, the height of the vantage point is in some embodiments automatically determined based on the speed with which the drone is initially tossed upwards.

FURTHER REMOTELESS COMMAND CHANNELS

Drone Motion Commands

A further aspect of the disclosure provides a drone motion command channel, permitting the communication of user commands and/or instructions to a drone by physical movement of the drone. In this manner, specific commands can be given to the drone by making a predefined physical motion with the drone. For the purposes of this description, drone motion commands are to be distinguished from gesture commands. Whereas a gesture command channel provides for responsiveness of a drone to physical movements by the operator (including. e.g., hand gestures, body gestures, facial gestures, or the like), a drone motion command channel provides for responsiveness of the drone to physical movements imparted by the operator to the drone itself.

In some example embodiments, the drone thus comprises:
a motion sensing system to detect one or more aspects of physical motion of the drone;
a motion processor configured to interpret motion data captured by the motion sensing system to identify in the motion data a predefined drone motion command; and
a control system configured to perform a particular predefined operation corresponding to the identified drone motion command.

Launch Commands

In some example embodiments, drone motion commands to which the drone is responsive include one or more launch commands. As described with reference to some example embodiments above, launch commands comprise physical motion experienced by the drone at launch. Thus, one or more launch vector properties (e.g., a speed, an azimuth direction, and/or an elevation angle of a launch vector), one or more launch rotation properties (e.g., a speed of rotation and/or the orientation of an axis of rotation at launch), and/or an orientation of the drone at launch are in some embodiments automatically interpreted by a command interpreter or motion processor forming part of the drone, so that subsequent drone behavior is to at least some extent determined by a launch command communicated by the launch vector, rotation properties and/or launch orientation.

A number of example embodiments of such launch commands have been described previously with reference to general description of audio commands, automated flight behavior, or automated image-capture behavior. These previously described examples include:

- selection of a predefined flightpath based on launch rotation (e.g., a flyover for a horizontal axis of rotation and a fly around for a Frisbee-like vertical axis of rotation);
- determination of a radius at which the operator is to be followed, based on launch vector magnitude;
- selection of a stay position based on size and/or direction of the launch vector);
- determination of a distance at which a selfie is to be taken based on the magnitude of the launch vector; and
- determination of a height of a vantage point assumed for an overhead shot, based on the size of a vertical launch vector.

Drone Gesture Commands

In some example embodiments, drone motion command to which the drone is configured to be responsive comprises one or more drone gesture commands, being predefined motions or motion sequences imparted to the drone prior to launch. In accordance with this aspect of the disclosure, the operator can perform a specific physical gesture with the drone preflight, with subsequent in-flight behavior of the drone being determined to at least some extent by the properties of the physical gesture.

Thus, for example, a particular predefined flightpath can in some embodiments be communicated by a corresponding preflight drone gesture performed manually with the drone. In one example, a drone gesture command for a fly-around flightpath as described previously (i.e., flight along a horizontally disposed arc) comprises manually moving the drone in a horizontal circle before launch. In another embodiment, a similar fly-around command can be communicated by, preflight, rotating the drone by about 180° and back around a substantially upright axis. In analogous fashion, a drone gesture command for a flyover (i.e., flight along a substantially upright arc) in one embodiment comprises preflight manual movement of the drone in a circle lying in a substantially vertical plane. In another embodiment, a similar flyover command may comprise manual rotation of the drone through about 180° and back around a substantially horizontal axis.

In further example, a drone gesture command comprises tapping a selected person with the drone, responsive to which the drone automatically identifies the thus tapped person as a target person for image capture, following, or the like. It will be appreciated that the example drone gestures described herein are not exhaustive, and that many different predefined drone gestures with corresponding drone responses are contemplated.

Gesture Control

An aspect of the disclosure provides for gesture control of a drone, and for techniques to facilitate or improve the effectiveness of such a gesture control channel. It is again emphasized that gesture commands are to be distinguished from drone gesture commands. As used herein, a gesture command refers to a gesture performed by the operator separately from physical movement of drone. A drone gesture or drone gesture command refers to a gesture performed by physical manipulation of the drone. As will be described below, gesture commands can in some embodiment comprises device gesture commands, in which a control gesture is detected by movement of a device separate from the drone.

Note that various aspects of gesture command of drone behavior are described elsewhere herein with respect to various different aspects of the disclosure, and that those aspects of the disclosure are to be read as forming part of the presently discussed aspect of the disclosure.

The drone or a drone system of which the drone forms part are in some embodiments configured to recognize gesture commands based at least in part on image processing. In accordance with this aspect of the disclosure, a drone or drone system is configured to perform operations comprising:

- capturing image data (e.g., a video stream) of an operator of the drone;
- processing the image data to recognize therein a predefined gesture command performed by the operator;
- identifying a drone operation corresponding to the identified gesture command; and
- executing the corresponding drone operation responsive to identification of the gesture command.

Gesture control is in some embodiments facilitated by automated recognition of a person identified as the operator of the drone. It will be appreciated that a video stream captured by the drone may in some instances include a plurality of persons, and that automated recognition of the operator in distinction to other persons facilitates effective gesture control by lessening the likelihood of operator confusion or hijacking of drone control by others.

Various aspects of automated operator recognition and/or tracking as described earlier with reference to voice control may apply equally to visual recognition and/or tracking of the operator for gesture control purposes. Thus, for example, processing of the image data to recognize gesture commands in some embodiments include automated identification of the operator by processing a video stream captured by an onboard camera of the drone, and automatically identifying as the operator a particular one of a plurality of persons captured in the video stream. As before, such identification in some embodiments comprise facial recognition, object recognition, and/or identification of a distinctive visual feature. In one example embodiment, the drone is configured responsive to launch to automatically identify as operator a person performing the launch, and thereafter visually tracking or recognizing the identified operator for gesture control purposes. Such identification of the operator at launch may be based on processing of a launch vector as indicated by motion sensors forming part of the drone. In such embodiments, a point of origin of the launch may be identified based on the launch vector, with a person at the identified point of origin being identified as the operator.

Instead, or in addition, automated recognition of the operator may be based on preflight specification of a particular person as the operator. In one example embodiment, an image of the operator's face may be provided to or captured by the drone prior to flight to preprogram the drone for automated facial recognition of the operator. In one example embodiment, such a signature facial image may be captured by use of a portable electronic device such as a mobile phone of the user, the mobile phone being into communication with the drone to communicate the facial signature information to the drone.

In another embodiment, the signature facial image may be captured by use of an onboard camera of the drone. The drone may in such case have an input mechanism to facilitate image capture and association of the image with the operator. In one embodiment, the drone has an imprint button that, when pressed while the drone camera is trained on a particular person, causes an operator recognition module to imprint that person as the operator, whose gestures are to be recognized and executed.

In some embodiments, the drone is configured to autonomously identify a visually distinctive feature of the operator (e.g., subsequent to operator identification based on the launch vector), and thereafter to perform operator recognition based on the self-identified visually distinct feature. An example of such visually distinctive features is clothing of the operator, for example including brightly colored items of clothing. Other previously described aspects of drone configuration and behavior that in some embodiments apply mutatis mutandis for gesture control purposes include but are not limited to provision on the drone of a fixed or directional auxiliary camera for tracking and or capturing gesture commands performed by the operator.

Image processing to recognize command gestures in some embodiments comprises: recognizing a human shape associated with the operator; based on such shape recognition, identifying human arms and/or hands of the operator; and analyzing movement of the identified arms and/or hands to recognize one or more corresponding gestures. Note that, in some embodiments, gestures to which the drone is responsive comprise hand movements, for example comprising the shape of a movement path traced by one or more of the operator's hands. Instead, or in addition, the drone is configured to recognize gesture commands not only based on gross hand movements, but to recognize gesture commands based at least in part on hand shape, finger configuration and/or movement. For example, a back-forth-movement with an open hand may indicate a certain command, while the same movement with a closed fist or with a certain number of fingers raised may indicate different respective commands. Instead, or in addition, gesture commands can in some embodiments be variably interpreted based at least in part on orientation of the operator's hand. In one example, a back-and-forth movement with an open hand and palm facing towards the operator indicates a command for movement of the drone closer to the operator, while the same movement with the palm facing away from the operator indicates a command to move further away from the operator.

In some embodiments, gesture commands can comprise finger movement or changes in hand configuration. Such gestures based on finger movement can be separate from or in combination with movement of the hand as a whole. For example, movement of the four fingers excluding the thumb back and forth while the fingers point upward in one example embodiment indicates to the drone to return to the operator. In contrast, a similar movement of the fingers in unison while the fingers are pointed forward and the palm faces downward in such an embodiment indicates a gesture command for the drone to land at its current location.

In some embodiments, recognition of gesture commands by image processing is facilitated by use of a distinctively colored and/or shaped device that can be manipulated or worn by the user. This aspect of the disclosure provides a drone kit comprising a visually distinctive gesture device and a drone that is configured to recognize by means of image processing command gestures performed by movement of the gesture device. Examples of such gesture devices include a wristband, a set of rings, a paddle, a wand, or the like.

In some example embodiments, the video stream on which gesture recognition is performed is captured by a camera carried by the drone. As described earlier, such a video stream may be captured by the drone's primary camera, or may in other embodiments be captured by one or more auxiliary cameras. Instead, or in addition, gesture recognition may be based at least in part on gesture recognition performed with respect to a video stream captured by a camera separate from the drone. In one such example embodiment, a personal electronic device (e.g., a mobile phone or a pair of smart glasses) is configured to capture a video stream for gesture recognition. In an example embodiment in which the video stream for gesture recognition as captured by a pair of smart glasses, an onboard camera integrated in the smart glasses and automatically aligned with the direction of view of the user continuously captures video to include therein hand gestures performed by the operator within their field of view. In this manner, reliable gesture recognition can be achieved by hand gestures performed within the range of view of the glasses' camera.

Image processing for gesture recognition with respect to such a video stream captured by an off-board device is in some embodiments performed at least partly on by the offboard device (e.g., by processors forming part of the mobile phone or the smart glasses, as the case may be). In such embodiments, the image processing load is borne by the offboard device, so that the offboard video stream is not communicated to the drone. Instead, only control commands corresponding to the recognized gestures are communicated to the drone by the offboard device. In other embodiments, image processing for gesture recognition may be performed at least in part by one or more processors incorporated in the drone. In such an embodiment, the offboard video stream is communicated to the drone for processing at the drone.

As mentioned previously, a further aspect of the disclosure provides for a device gesture command channel, comprising command recognition based on motion experienced by a gesture device separate from the drone. A drone or drone system may thus be configured to perform operations comprising:

at a gesture device separate from the drone, capturing motion data (e.g., via a set of accelerometers incorporated in the gesture device) resulting from movement of the gesture device by an operator;

processing the motion data to recognize therein a predefined device gesture command performed by the operator;

identifying a drone operation corresponding to the identified device gesture command; and executing the corresponding drone operation responsive to identification of the device gesture command.

In some embodiments, the gesture device is a dedicated device. The gesture device in some embodiment comprise:

a wearable or a manipulable device body;

one or more motion sensors (e.g., a set of accelerometers) incorporated in the device body to capture motion data indicative of movement of the device body;

and a communication link configured for communicating the motion data to the drone or to a relay device such as a mobile phone carried by the operator.

Example embodiments of the form taken by the body of such a dedicated gesture device include, but is not limited to, a wristband, a ring, a wand, or the like.

In some embodiments, gesture control is by means of a set of gesture devices, such as a pair of wristbands, a set of rings, or the like. Gesture control may thus be based on combined movement of the respective gesture devices of the set. Motion data captured, for example, by respective rings worn on different fingers of the user can in such cases be processed to accurately determine movements and/or orientation of the operator's hand(s) and/or fingers.

In other example embodiments, the gesture device is a multifunctional portable electronic device. In one such embodiment, a mobile phone or tablet is configured for use as the gesture device, e.g. by execution on the multifunctional device of a gesture control application. Thus, for example, a mobile phone executing the gesture control application is configured to access sensor data captured by accelerometers and/or orientation sensors of the phone, and to communicate the sensor data (or, in some embodiments, control signals derived by the controller application from the sensors data) to the drone via a communication link established between the mobile phone and the drone.

Similar to alternative architectures described previously with respect to audio processing (for speech/voice command recognition) or image processing (for voice recognition or gesture recognition) either at the drone or at offboard processors, the sensor data captured by the phone can in some embodiments be processed for device gesture command recognition by one or more processors forming part of the drone. Instead, device gesture command recognition based on sensor data may in other embodiments be performed by one or more processors of the personal electronic device (e.g., the mobile phone), the processors being configured by the gesture control application to perform the device gesture command recognition. Instead, or in addition, processing of the sensor data for device gesture command recognition may be performed by one or more processors remote from both the gesture control device and the drone, for example being performed by an online server with which the mobile electronic device is in communication via the Internet.

Returning to description of gesture control generally (irrespective of the particular mode of gesture recognition), note that different types of gesture commands and corresponding drone operations can in different embodiments be predefined for recognition and execution by the drone. Any of the example flightpaths or behaviors described elsewhere herein with respect to the voice commands or preflight drone gesture commands can in various embodiments be triggered by a corresponding gesture command performed by the operator.

Note that, in some embodiments, the drone is configured to be responsive not only to in-flight gesture commands, but instead or in addition to recognize preflight gesture commands. In an example embodiment, an operator can, before launch, perform a manual gesture indicating to the drone a particular flightpath that is to be followed, a particular person that is to be followed or tracked, or perform a gesture according to any of the other commands discussed herein. Responsive to such a preflight gesture command (which may in some embodiments comprise a device gesture command), the drone thereafter executes the indicated operation.

Thus, for example, the operator can in one embodiment preflight make a manual motion or sign corresponding to a gesture command for performance of a particular flightpath or sequence of operations. A video stream that includes such a motion or sign is thereafter processed, and the particular gesture command is identified. After launch, the drone then executes the flightpath(s) and/or operation(s) corresponding to the identified gesture command.

Various drone operations are in different embodiments controllable by means of gesture commands. These include example operations and flightpaths described elsewhere herein with reference to various example embodiments.

In some embodiments, the drone may be configured for gesture control of in-flight positioning or speed by way of gesture control. Thus, in one example embodiment, the drone positioning can be adjusted by the user by way of hand signals. In such an example embodiment, the drone may be moved horizontally or vertically by a manual back-and-forth motion, with the direction of the intended movement corresponding to the direction in which the operator's open palm faces. Once the drone is in the desired position, the operator may hold up their hand palm outwards, to communicate to the drone a gesture command to stay in the present location.

Available gesture commands may in some embodiments include gesture commands with respect to camera operation. For example, the operator can in some embodiments indicate by way of manual gesture a particular image type that is to be captured (e.g., selfie, group shot, etc), activate a particular camera mode (e.g., video or photo), and/or trigger image-capture. In accordance with the latter of these example camera functions that are gesture-controllable, the operator can indicate by way of hand gesture, body gestures, facial gesture, or device gesture a command to "take the picture now."

Drone Control Via Mobile Device UI

As mentioned with reference to some of the previously described embodiments, drone control can in some embodiments be effected or facilitated by use of a multifunctional mobile electronic device, such as a mobile phone. For ease of description, such a device is occasionally in this description referred to as a mobile device, but it should be borne in mind that the description applies equally to different multifunctional mobile electronic devices (such as a tablet or a PDA) that can be employed in other embodiments. Further, the term mobile device is used with respect to a multifunctional mobile electronic device, which is distinct from a dedicated remote control device occasional used with some conventional drones.

One aspect of the description provides for drone control via a command user interface presented on the mobile phone, instead of or in addition to the previously described use of the mobile phone for facilitating gesture control (e.g. by capturing a video stream of the operator or by sensing physical gestures performed with the mobile phone) and/or for facilitating voice control (e.g., by capturing an audio stream and/or a video stream proximate the operator for command recognition or voice disambiguation purposes).

As described previously with respect to automated homing behavior, the command user interface on the mobile device can in some example embodiments be used to specify a homing location for the drone. Such user-selection of the homing location in one embodiment comprises haptic selection of the homing location on a photographic image, a video image, or a map displayed on a touchscreen of the mobile device.

In some embodiments, the command user interface may comprise user guidance or flightpath definition on a visual representation of an ambient environment in which the drone is located. In a particular embodiment, for example, a flightpath to be followed by the drone is inputted by the user such as to overlay a visual representation of the drone environment displayed on a screen of the mobile device. The inputting of the flightpath via the command user interface in some embodiments comprises haptic tracing of the flightpath on a touchscreen of the mobile device.

In some embodiments, the visual representation of the drone environment comprises a camera image captured of the drone environment. In some embodiments, the image on which the flightpath is overlaid for remote guidance of the drone is an image captured by the mobile device, while in other embodiments, the image may be captured by the onboard camera of the drone. Thus, in some embodiments, the command user interface displays substantially live images or video captured by the drone camera. Responsive to the user tracing the intended flightpath on such an image or video, the drone automatically travels through the pictured environment along the specified flightpath.

Autonomous navigation of the drone along the specified flightpath in some embodiments comprise performance of image processing on the base image on which the flightpath is inputted, to automatically recognize one or more objects in the drone environment. Subsequent navigation can in such embodiments comprise continual image-capture and object recognition, to reference the specified flightpath relative to the recognized objects as the vantage point of the drone changes during travel along the flightpath.

In other embodiments, the visual representation of the drone environment comprises a map of the drone environment. In one embodiment, the drone has a positioning system (e.g., a GPS device) configured to reference the position of the drone relative to such a map. Responsive to a user tracing or otherwise specifying a flightpath in combination with the map displayed on the mobile device, a navigation system forming part of or in communication with the drone thereafter controls navigation of the drone along the specified flightpath based on a combination of the map information and continually updated location information for the drone as determined by the positioning system.

Note that some aspects of this disclosure are directed to a drone that is configured to perform the various applicable operations as described with reference to the different example embodiments herein. Other aspects of the disclosure are directed to a system that is configured to perform the various operations as described with reference to the different example embodiments hereto. Such a system can include, for example, a drone and a cooperative multifunctional device, or a drone and a cooperative dedicated gesture device.

Further aspects of the disclosure are directed to a mobile electronic device configured to perform various operation described with reference to different example embodiments as being applicable to such a device. This aspect of the disclosure includes a multifunctional electronic device, such as a mobile phone, that has stored thereon machine-readable instructions for performance of operations corresponding to those comprising any of the embodiments described herein.

Yet further aspects of the disclosure are directed to a machine-readable storage medium that has stored thereon instructions to cause a machine, when executing the instructions, to perform operations comprising a method according to any of the example embodiments described herein.

DETAILED DESCRIPTION

FIG. 1 shows a schematic view of a UAV or aerial drone 104 accordance with one example embodiment. Note that in the schematic drawings, the schematic representations of system components such as the drone 104, a mobile phone, an offboard microphone, and the like are not comprehensive representations of all components of these devices, but rather focus on those components particularly pertinent to the current disclosure.

The drone 104 is a noncommercial, personal drone designed and configured for short-range flights within visual range of an operator 100. In this example embodiment, the drone 104 is a battery-powered quad copter-type aerial vehicle that is relatively lightweight and sized for ready portability and manual launch.

In the example embodiment of FIG. 1, the drone 104 is configured for remote control by an operator 100 during flight exclusively by use of audio or voice commands. The drone 104 is in this example embodiment moreover configured for voice control directly between the operator 100 and the drone 104, without intermediation by any offboard microphone or electronic device.

To this end, the drone 104 includes an onboard microphone 108 incorporated in the drone 104 and mounted on a body of the drone 104. The onboard microphone 108 is in this example embodiment a multidirectional or omnidirectional microphone mounted on the body in a fixed orientation.

The drone 104 comprises, in conventional fashion, a controller 114 comprising one or more processors configured to perform various automated control functions such as those described herein. The controller 114 is in communication with electromechanical flight systems 151 to control in-flight behavior of the drone 104. The controller 114 is further in communication with an onboard memory 141 and a variety of sensors 161 mounted on the drone body for measuring different respective metrics. The sensors 161 include a set of accelerometers arranged to measure not only directional linear acceleration of the drone, but also triaxial rotation and changes in orientation of the drone 104. The drone 104 further includes a camera 112 communicatively coupled to the controller 114 and suitable for use in capturing either digital video content or digital photographs.

The drone 104 further has a voice recognition engine 120 configured to recognize a particular voice in an audio stream captured by the onboard microphone 108 as being that of the operator 100. A speech recognition engine 124 forming part of the drone 104 is configured to recognize within an operator voice stream isolated by the voice recognition engine 120 any predefined spoken commands, and to communicate the identified operator-issued commands to the controller 114. It will be appreciated that although the speech recognition engine 124 and the voice recognition engine 120 are shown to be separate from the controller 114, these components may in other embodiments be provided by a single processing unit, or by a greater number of dispersed hardware components and/or software components.

The drone 104 in this particular example further includes an active noise suppressor 132 to provide active noise reduction with respect to noise generated by an electrical motor and rotating blades of the drone 104 in-flight, thereby to increase fidelity of voice streams captured by the onboard microphone 108. The active noise suppressor 132 is configured to reduce drone noise by the addition of a second sound specifically designed to cancel or reduce the drone noise by destructive interference. A resulting noise signal to which the onboard microphone 108 is exposed (as opposed to the voice signal it is intended to capture) is thereby reduced substantially to white noise that may in some instances be of lower amplitude than the original drone noise. It will be appreciated that the active noise suppressor 132 in this example embodiment thus includes signal processing circuitry coupled to a speaker to dynamically and adaptively generate a sound wave with substantially the same amplitude as the drone noise, but with inverted phase. The active noise suppressor 132 further comprises one or more speakers mounted on the drone for generating an active noise suppression signal As mentioned, the drone 104 is in this example configured specifically for remote control exclusively by voice commands issued by the operator 100. Such commands may be issued by the operator 100 both preflight or in-flight. A list of accepted commands and their corresponding functions may in some embodiments be unchangeably set by default. In other embodiments, default speech commands can be edited or changed by the user via an interface providing such functionality.

Example speech commands to which the drone 104 is responsive include (but is not limited to) identification of a particular flight pattern, controlling in-flight movement of the drone 104, identification of a target object for image-capture, and in-flight control of camera functions.

As a specific example, the user may issue a predefined preflight command "TAKE A SELFIE." If the user thereafter launches the drone 104, it automatically moves a certain distance away from the operator 100 and directs the camera 112 towards the face of the operator 100. Note that the direction and distance at which the drone 104 automatically positions itself may in some examples be determined by the direction and strength at which the operator 100 launches the drone 104. The drone 104 may then hover in place, until the operator 100 issues a command such as "TAKE THE PICTURE." after which a digital picture is captured following a preset delay. Other camera functions thus controllable may include (but is not limited to) switching between video and photo mode, starting or stopping recording of video content, zooming in or out, and changing altitude or position.

In another example, a user may command the drone 104 to follow the operator 100 such that it is stationary relative to the operator 100 and continually focuses the camera 112 on the operator 100, by issuing (either in-flight or preflight) a command such as "FOLLOW ME." It will be appreciated that the above-described example voice commands through which the drone 104 may be controlled is only a selection of drone operation commands that are contemplated, and is non-exhaustive.

Voice commands issued by the operator 100 are represented in an audio stream captured by the onboard microphone 108. As mentioned previously, the signal-to-noise ratio of such a voice signal is increased by operation of the active noise suppressor 132. The recorded audio stream is then analyzed by the voice recognition engine 120 to identify and isolate a voice stream belonging specifically to the operator 100. It will be appreciated that a number of different persons may be within audio range of the drone 104 and that discrimination between different voices serves in this example embodiment to enable control of the drone exclusively by the designated operator 100.

In this instance, voice recognition is performed by comparing respective voice streams to an operator voice signature or characteristics stored in the memory 141. The voice stream extracted by the voice recognition engine 120 is thereafter analyzed by the speech recognition engine 124 to identify the presence of any one of the list of predefined voice commands in the operator audio stream. The identified command is communicated to the controller 114, which controls execution of the operator-issued commands.

Figure 1A:
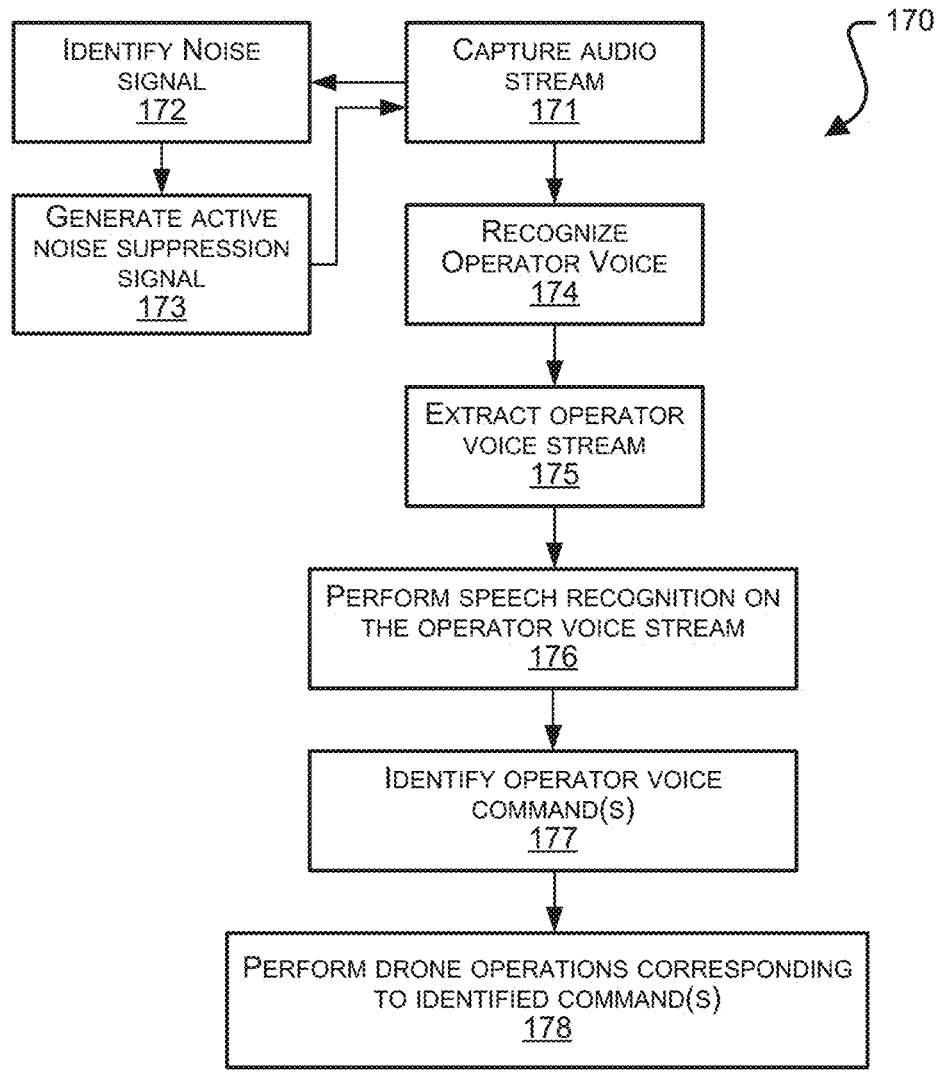
FIG. 1A is a flow chart illustrating a method of controlling a drone, according to some example embodiments.

FIG. 1A shows a flow diagram of a method 170 performed by the drone 104 in accordance with one example embodiment. At operation 171, an audio stream is captured by the drone microphone 108. At operation 172, the active noise suppressor 132 processes the audio stream to identify a noise signal forming part of the audio stream. The active noise suppressor 132 thereafter generates, at operation 173, an active noise suppression signal by playing via a speaker system forming part of the drone 104 a sound signal substantially inverted relative to the identified noise signal.

At operation 174, the voice recognition engine 120 recognizes or identifies the operator voice in the audio stream, in distinction to other voice streams that may be captured in the audio stream. At operation 175, the voice recognition extracts the operator voice stream.

At operation 176, the speech recognition engine 124 perform speech recognition with respect to the extracted or isolated operator voice stream, and thereby identifies, at operation 177, any operator voice commands included in the operator voice stream.

Thereafter the controller 114 causes execution, at operation 178, of all identified operator voice commands. Note that in this and in any of the other applicable example embodiments, operator voice commands may control not only drone operation but also operation of the camera 112 carried by the drone.

A benefit of the example embodiment of FIG. 1 is that the drone 104 is conveniently operable without the need for any remote control device. In addition, efficacy of first control is an improved by the active noise suppression performed by the drone 104, and potential confusion as to which voice to obey is ameliorated by voice disambiguation as described with reference to operation of the voice recognition engine 120.

Although the example embodiment of FIG. 1 provides for in-flight user control exclusively by voice, the voice command features described with reference to FIG. 1 may in other embodiments be provided in combination with one or more additional command channels, such as a wireless remote control device, gesture control, or the like, for example such as those described elsewhere herein with respect to different example embodiments.

Figure 2:
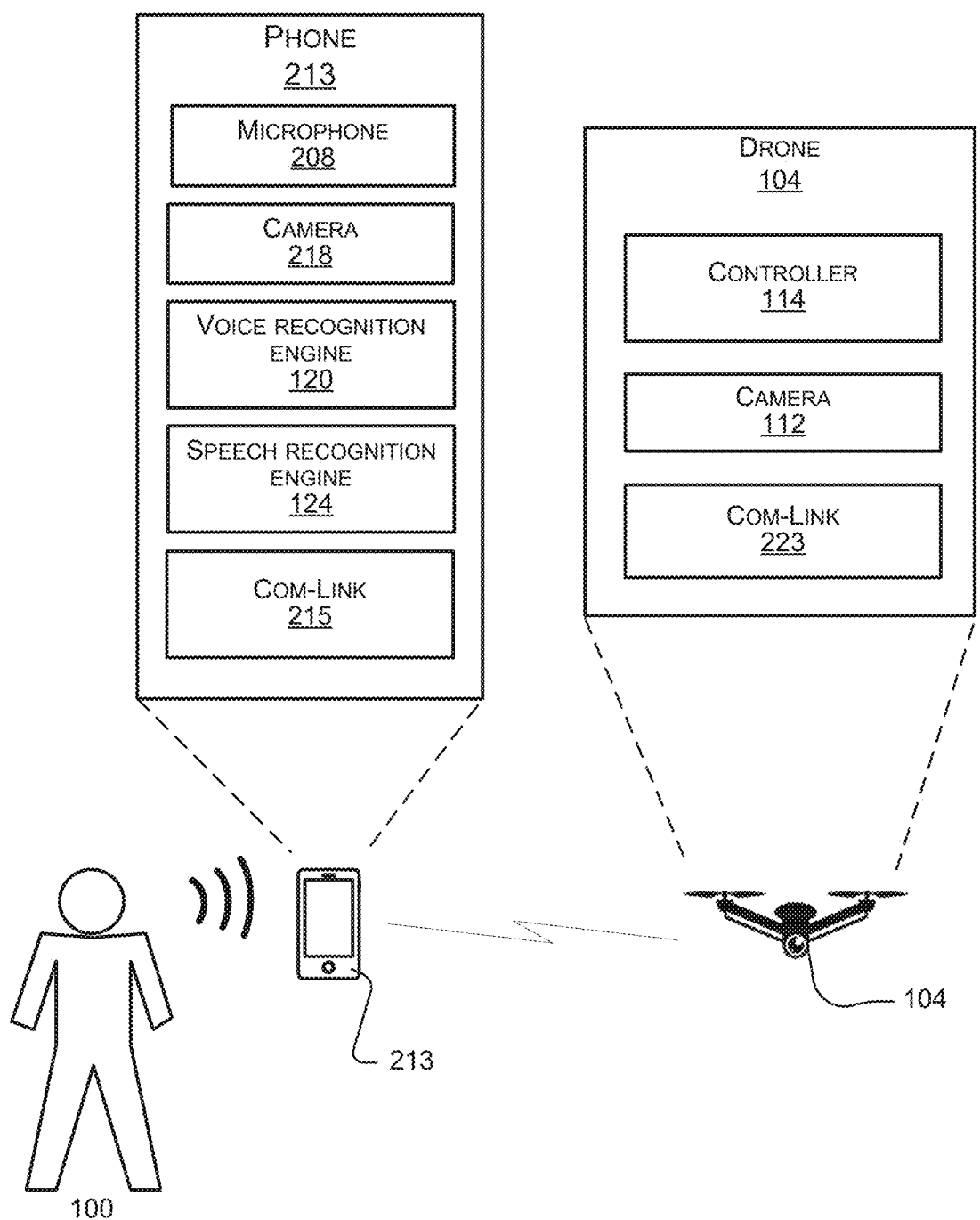
FIG. 2 is a schematic diagram of a drone system with voice control functionality enabled by use of an offboard mobile electronic device, according to some example embodiments.

FIG. 2 shows an example embodiment in which voice control of the drone 104 is effected by use of an offboard microphone 208 incorporated in a remote control device separate from the drone 104. In this example embodiment, the remote control device is a multifunctional device in the form of a mobile phone 213. In other embodiments, the remote control device may be provided by a dedicated microphone, or by a game console-type controller with an integrated microphone 208.

Thus, in the example embodiment of FIG. 2, an audio stream including operator commands is received not at the drone 104 (as is the case in the example embodiment of FIG. 1), but is instead captured by the offboard microphone 208 incorporated in the mobile phone 213. A wireless communication link is provided between the drone 104 and the phone 213 by way of respective com-link components 215, 223. In some embodiments analogous to that of FIG. 2, the audio stream captured by the phone 213 may be communicated directly to the drone 104 for processing at the drone 104. In this example embodiment, however an audio processing load is offloaded substantially entirely to the phone 213.

In some embodiments, voice recognition (to identify the voice of the operator in contradistinction to other voices that may be present in the captured audio stream) is not performed as part of the audio processing, as the operator voice can be expected to be dominant in the audio stream captured by the phone 213. In such embodiments, audio commands may be identified by a speech recognition engine 124 provided by execution of drone-specific software on the phone 213, and the resultant commands may be communicated directly to the drone 104 for execution by the controller 114.

In the example embodiment of FIG. 2, however, the relevant application executed on the phone 213 additionally provides the voice recognition engine 120 for discriminating between different voices in the audio stream. In this example, such voice recognition is aided by the capturing of synchronized video content via a front facing integrated camera 218 of the phone 213. The voice recognition engine 120 processes the video stream in synchronized comparison with the audio stream, to automatically recognize speech-related facial movements of the operator 100, and to correlate such visually recognized speech with the particular voice stream received in synchronicity therewith.

A benefit of the example embodiment of FIG. 2 is that the drone 104 can be substantially reduced in weight and size by the offloading of various components to the remote control device provided by the phone 213. Speech recognition reliability and accuracy is also expected to be improved due to increased quality in audio received by the offboard microphone 208. This is not only because the mobile phone 213 remains in close proximity to the operator 100, but also because the noise caused by the drone's engine and/or propeller systems is further from the phone's microphone 208 than is the case with an onboard microphone 108.

Figure 3:
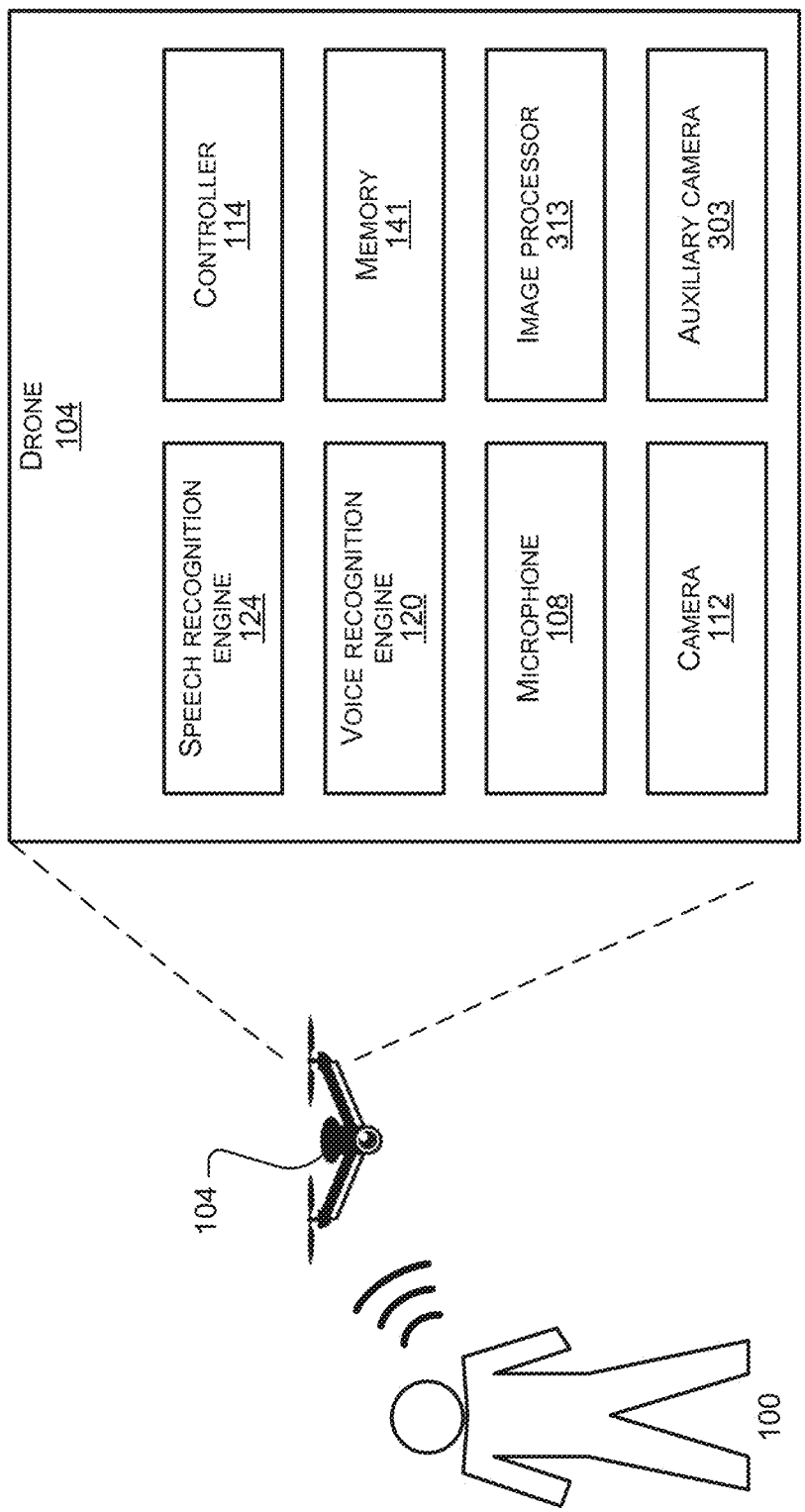
FIG. 3 is a schematic diagram illustrating a drone system with voice-control functionality based at least in part on image processing, according to some example embodiments.

FIG. 3 shows an example embodiment corresponding substantially to that of FIG. 1, with a major distinction being that the drone 104 includes an auxiliary camera 303 mounted thereon for continuously capturing a video feed in which the operator 100 is present. The video feed captured by the auxiliary camera 303 is processed on-the-fly by an onboard image processor 313 to recognize the face of the operator 100 and to identify facial movements of the operator 100 indicating speech. Such visual speech detection by the image processor 313 is used by the voice recognition engine 120 in isolating the operator voice stream by correlating automatically recognized facial movements of the operator 100 with a synchronously received voice stream, as described with reference to FIG. 2.

To reliably include the operator 100 in the video feed of the auxiliary camera 303, the auxiliary camera 303 in this example embodiment has a wide angled lens configured for providing a viewing range of 360° around an operatively upright axis, and greater than 180° in both remaining axes orthogonal to the upright axis. This wide-angled auxiliary camera 303 is mounted on a lower side of the drone body, thereby to continuously capture substantially everything below and at the vertical level of the drone 104, in use. As mentioned elsewhere, some similar embodiments may provide for two or more auxiliary cameras 303 which are coordinated to cover the entire environment of the drone 104, both below and above the level of the drone 104.

Figure 4:
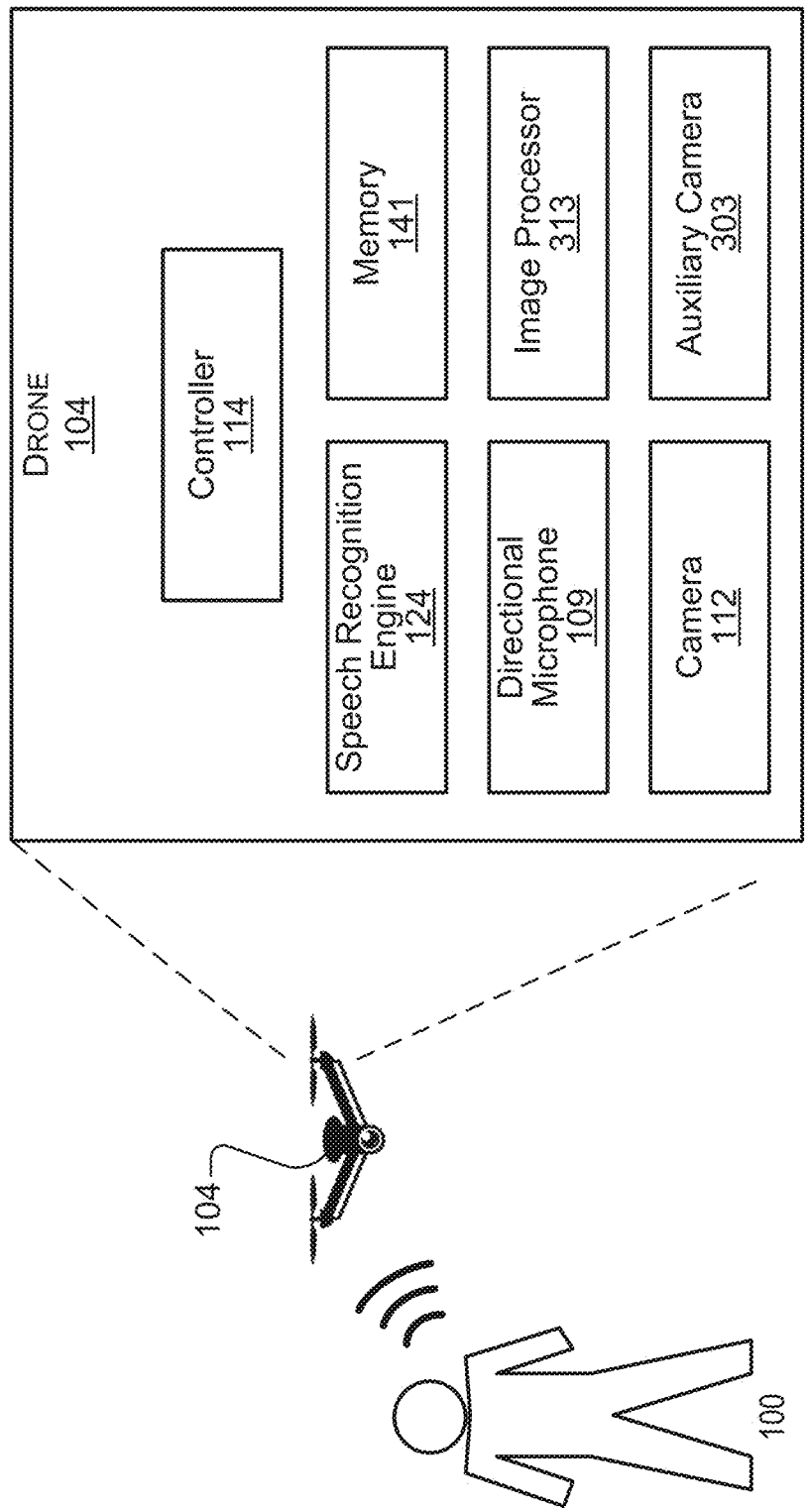
FIG. 4 is a schematic diagram illustrating a drone system with voice control functionality enabled by a directional onboard microphone, according to some example embodiments.

FIG. 4 shows an example embodiment similar to that of FIG. 3, with a major distinction being that the onboard microphone is a highly directional microphone, in this example embodiment being a parabolic microphone. The directional microphone 109 is dynamically movable with respect to the drone body. The image processor 313 is in this embodiment configured automatically to detect the operator 100 in the video feed from the auxiliary camera 303, and to track the location of the operator 100. This information is used by the controller 114 automatically to point the directional microphone 109 consistently at the operator 100. As a result, the presence of voice streams other than that of the operator 100 in the captured audio stream is significantly reduced or eliminated, thereby increasing the signal-to-noise ratio of the specific voice signal to which the drone 104 is to respond. For this reason, audio processing in the example embodiment of FIG. 4 can effectively be performed without additional voice recognition. In other embodiments, an operator-tracking directional microphone 109 such as that of FIG. 4 can be provided in combination with automated voice recognition as described elsewhere.

A further aspect of the disclosure provides for the capturing of audiovisual content by use of a drone, with improved audio quality compared to conventional drones. In some embodiments, such improved audio quality is achieved by combining audio captured by an offboard microphone (e.g., captured by a mobile electronic device such as a mobile phone carried by the operator) with the video content captured by the drone camera. In a system such as that of, for example, FIG. 2, the system automatically stores audio captured by the offboard microphone 208 provided on the user's mobile phone 213 with the video feed captured by the primary camera 112 of the drone 104. The captured audio may in such examples be streamed to the drone 104, for combination and storage with the video in drone memory. Instead, the video feed may be streamed from the drone to the remote control device (in this example, the phone 213) for collection and storage on a memory of the phone 213.

A benefit of such a system is that drone noise typically generated by the drone's motor and blades is omitted from the synchronized audio track captured close to the operator 100. It will be appreciated that such audio improvement techniques may be applied in some embodiments to arrangements that do not provide for voice controlled operation of the drone, as described herein.

A different disclosed technique for capturing audio of improved quality may comprise use of a directional microphone such as that described with reference to FIG. 4 above. In such embodiments, a directional microphone 109 on the drone 104 can be configured not to continuously track the operator 100 for receiving voice commands, but can instead be controlled to point in the same direction or at the same target as the primary camera 112 of the drone 104. The directional microphone 109 and the camera 112 are in such cases moved in synchronization, so that the audio captured by the directional microphone 109 is consistently highly directional audio that corresponds in capture direction to the direction from which synchronous video footage is captured. A benefit of such techniques is that the resultant audiovisual track has audio with reduced drone noise and reduced background noise extraneous to the subject of the video footage captured by the camera 112.

Note, again, that the improvement of audio quality in an audiovisual track by use of the directional microphone as described can in some embodiments be provided in combination with any of the mechanisms for voice control of the drone, and may in other embodiments be provided in drones that are not configured for voice control. In some embodiments, the drone may be provided with two directional microphones, one automatically tracking the operator for receiving voice commands and the other automatically tracking the camera target zone.

Figure 5:
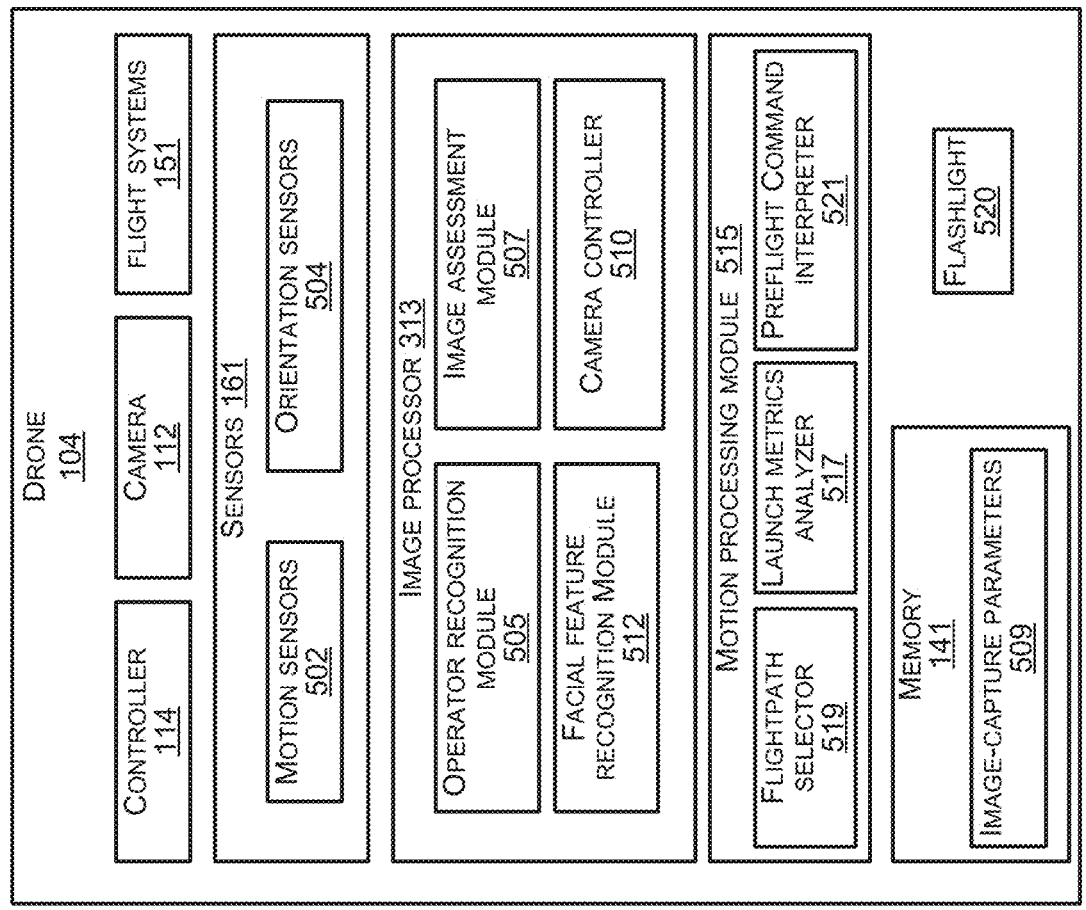
FIG. 5 is a schematic diagram illustrating a drone system with fully automated flight and image-capture behavior that is variable based on variation in launch metrics, according to some example embodiments.
Figure 5:
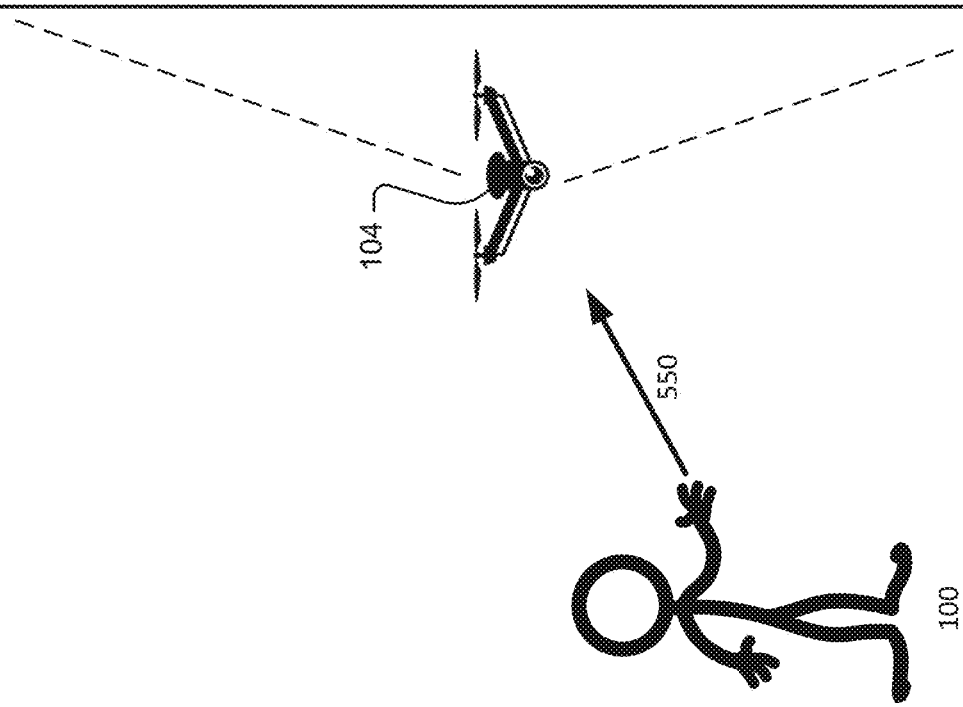

FIG. 5 shows an example embodiment of a drone 104 analogous to the previously described embodiments, with a major distinction being that the drone 104 is configured for fully autonomous behavior after launch, having no command channels for receiving my commands from the operator 100. Additional previously described aspects of the disclosure that are exemplified by the drone 104 of FIG. 5 include enablement to receive and respond to motion commands in the form of preflight drone gesture commands, as well as launch commands indicated by launch metrics. The number of aspects relating to automated image framing and/or capture is also exemplified by the architecture of FIG. 5. Previous description of these aspect should be understood as forming part of this detailed description.

The onboard sensors 161 of the drone 104 include motion sensors 502 in the example embodiment of a triaxial accelerometer array. The sensors 161 further include orientation sensors 504 that determine the current orientation of the drone 104. The sensors 161 thus provide motion data indicative of any acceleration, rotation, and/or change of orientation that may be experienced by the drone 104.

The drone further includes a motion processing module 515 that is in communication with the image processor 313 to perform motion processing operations with respect to the motion data. In this example embodiment, the motion processing module 515 includes a launch metrics analyzer 517 configured automatically to detect the launch of the drone 104, for example by manual throwing or tossing of the drone 104 into the air by the operator 100. A launch metrics analyzer 517 is further configured to determine specific values for a number of launch metrics. Launch metrics assessed by the launch metrics analyzer 517 in this example includes specifics of a launch vector 550, and the size and direction of rotation of the drone 104 at launch. The launch vector is automatically analyzed to identify both its azimuthal and elevational directions, as well as the size of the launch vector (e.g., the speed and/or acceleration of the drone during a launch event).

The motion processing module 515 further includes a preflight command interpreter 521 configured to identify a drone gesture commands performed with respect to the drone 104 before flight. Examples of such preflight drone gesture commands have been described elsewhere herein, and in this example embodiment include indication of a particular flightpath to be followed by a particular movement or movement sequence manually performed on the drone 104. Another example drone gesture command is identification of the operator or a target subject for photography purposes by tapping of the selected person with the drone 104.

The motion processing module 515 further comprises a flightpath selector 519 configured automatically to select a particular flightpath indicated by the motion data, as determined either by the launch metrics analyzer 517 or the preflight command interpreter 521. The motion processing module 515 is in communication with the controller 114 of the drone 104, to effect automated performance of the identified drone motion command(s).

The drone 104 is, as mentioned, configured for at least partially autonomous image framing and/or capture. To this end, the drone 104 includes an image processor 313 configured to process image data captured by the camera 112 (and, in some embodiments, by an auxiliary camera 303 such as described with reference to other example embodiments), and to control in-flight and positioning of the drone 104 based on the image processing. Results of such image processing is in this example embodiment additionally used for automated control at least some functions of the camera 112 by operation of a camera controller 510 forming part of the image processor 313.

The image processor 313 includes an operator recognition module 505 to automatically identify the operator 100 based at least in part on the image data. In this instance, operator identification is additionally based at least in part on the launch metrics. Thus, at launch, the motion data is processed to identify the launch origin, after which image data from the launch origin is automatically processed to identify the operator who is, for example, to be tracked or to be photographed.

Image processor 313 further includes an image assessment module 507 configured to perform analysis of an image to be captured by the camera 112 based on a corresponding image-capture parameters 509 stored in a memory 141 of the drone 104. Based on the analysis performed by the image assessment module 507, the camera controller 510 and the electromechanical flight systems 151 is provided with instructions to change the drone vantage point and/or the camera settings (e.g., zoom level, focus, direction, etc.) until the images framed and satisfaction with the image-capture parameters 509.

The image processor 313 further includes a facial feature recognition module 512 configured to automatically recognize and track one or more facial features of the operator (or, in some embodiments, of a plurality of persons who are to be photographed). In this example embodiment, the facial feature recognition module 512 automatically recognizes and assesses a facial expression of the operator 100, and also assesses whether or not the eyes of the operator 100 are trained on the drone 104 and are open. The camera controller 510 is in this example configured to capture an image of the operator only when the facial expression of the operator is identified as corresponding with a smile while the operator 100 as their eyes open, looking at the drone 104.

The drone 104 further has a flashlight 520 which is configured for automatic activation by the camera controller 510 if it is determined by the image processor 313 that lighting of the picture subject is insufficient.

In a particular use application of the example drone 104 of FIG. 5, the drone may be used in a selfie mode to capture a so-called selfie of the operator. Upon launch, the drone 104 automatically recognizes the operator 100 based at least on the launch vector, and thereafter maintains the identified operator 100 within view of the camera 112.

The drone 104 automatically determines the distance at which the image is to be captured by assessment of the scalar size of the launch vector 550. The elevational angle of the drone 104 relative to the operator 100 is likewise determined by the angle of elevation of the launch vector 550. The azimuth angle (i.e., the horizontal position around the operator 100) is in this embodiment, however, automatically determined by the drone 104 based at least in part by the image assessment module 507 and/or based on the image-capture parameters 509. For example, the image-capture parameters 509 in this instance specifies a particular composition for the selfie (e.g., with the eyes of the operator 100 being located centrally within the frame), and further specifies that the image is to be captured from the best lit side of the operator's face. To satisfy these image-capture parameters 509, the drone 104 may thus automatically change its azimuth angle and may change a zoom level of the camera 112 to improve image quality as assessed based on the image-capture parameters 509.

Once the image is automatically framed satisfactorily, according to the image-capture parameters, the selfie image is captured when the operator smiles and looks at the drone 104, as determined by the facial feature recognition module 512.

Figure 5A:
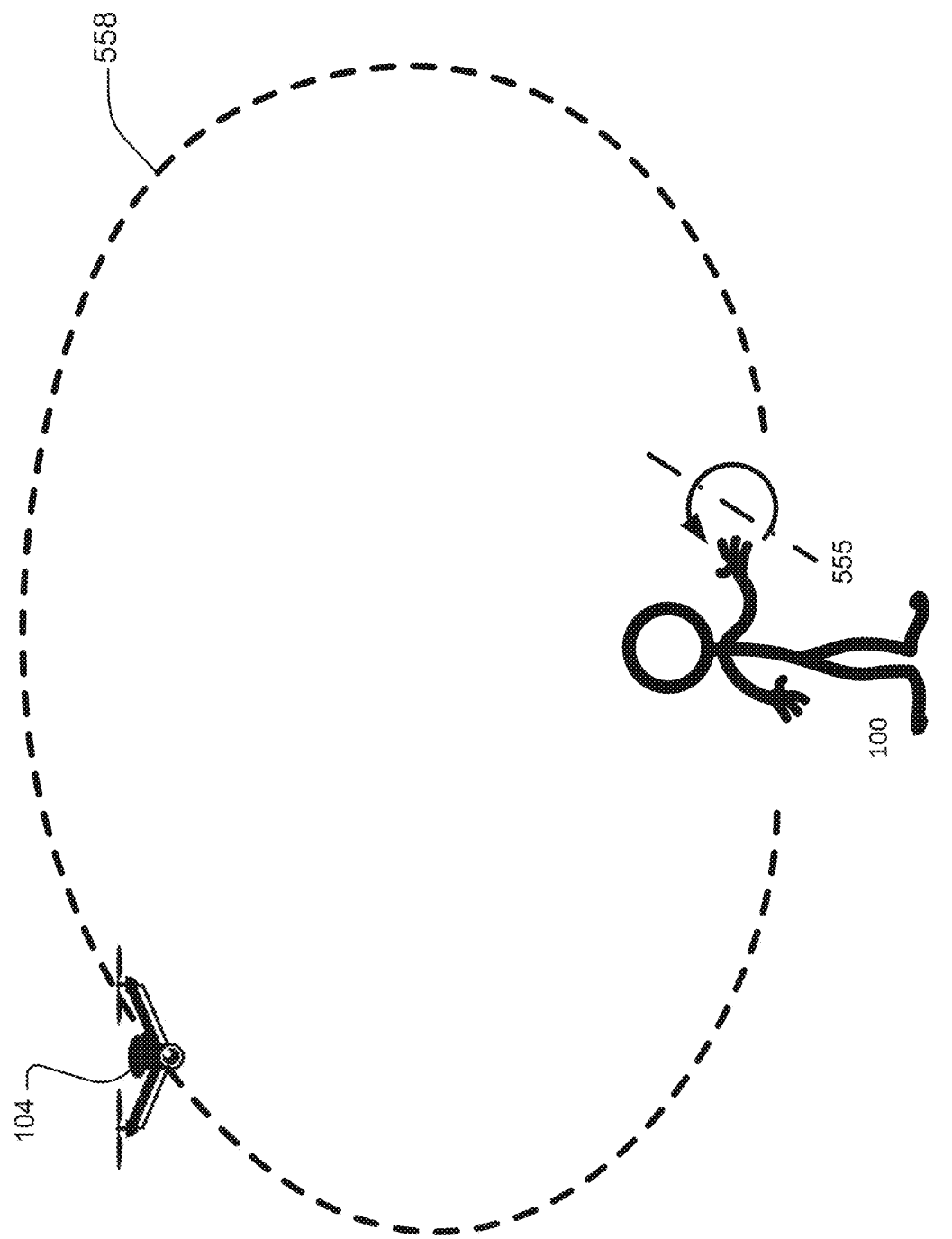
FIGS. 5A and 5B are schematic illustrations of different flightpaths that may be triggered in a drone according to FIG. 5 by different drone rotations at launch, according to some example embodiments.
Figure 5B:
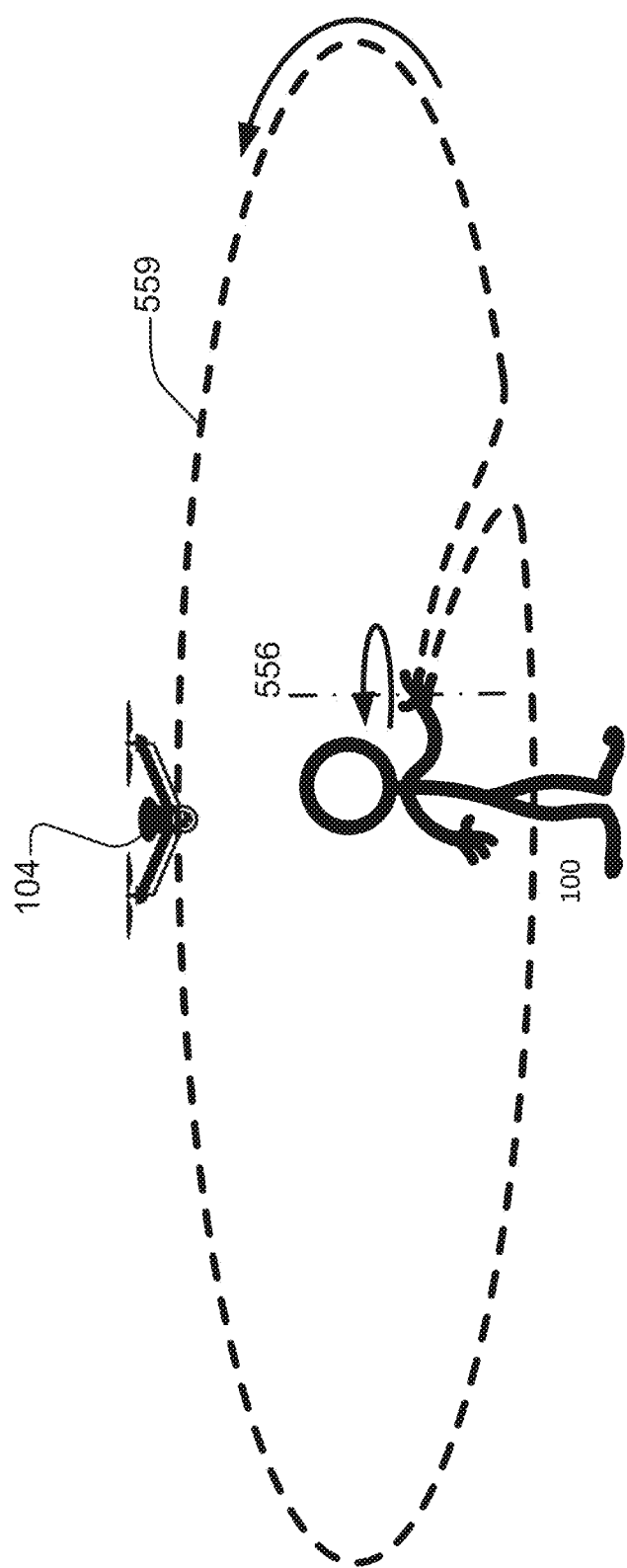

FIGS. 5A and 5B illustrate to alternative automated flightpaths which the operator 110 cause the drone 104 to perform based on variation of the launch metrics. In these examples, the respective flightpaths are selectable by imparting to the drone 104 a rotation about a particular rotational axis at launch.

In FIG. 5A, a flyover flightpath 558 is selected by the operator by launching the drone 104 with a substantially horizontal axis of rotation 555. In this example, the drone is thus manually spun backwards during launch. The motion processing module 515 determines the orientation of the rotational axis 555 by operation of the launch metrics analyzer 517, responsive to which the flightpath selector 519 selects the flyover flightpath 558. The flyover flightpath 558 comprises an arc that lies in an upright plane. In this example embodiment, the flyover flightpath 558 is substantially vertical, but in other embodiments, the arc may lie in a tilted plane corresponding to an off-horizontal tilt of the rotational axis 555.

In this example embodiment, the drone 104 automatically captures a video clip focused on the operator 100 during the flyover. Automated operator recognition for identification is in this example embodiment based on launch vector analysis as described previously.

A fly-around flightpath 559 as illustrated in FIG. 5B is selected in a manner analogous to that described with reference to FIG. 5A, the difference being that the rotational axis 556 of the drone 104 at launch a substantially vertical. Based on such an upright rotational axis 556, the drone 104 automatically follows an arc lying in a substantially horizontal plane while continuously capturing video content focused on the operator 100

Note that various of the features described with reference to FIG. 5 (such as automated operator recognition, drone gesture commands, launch metric responsiveness, and automated image framing and timing) may in other embodiments be employed in combination with a drone that is configured to receive in-flight commands via any of the described command channels.

Figure 6:
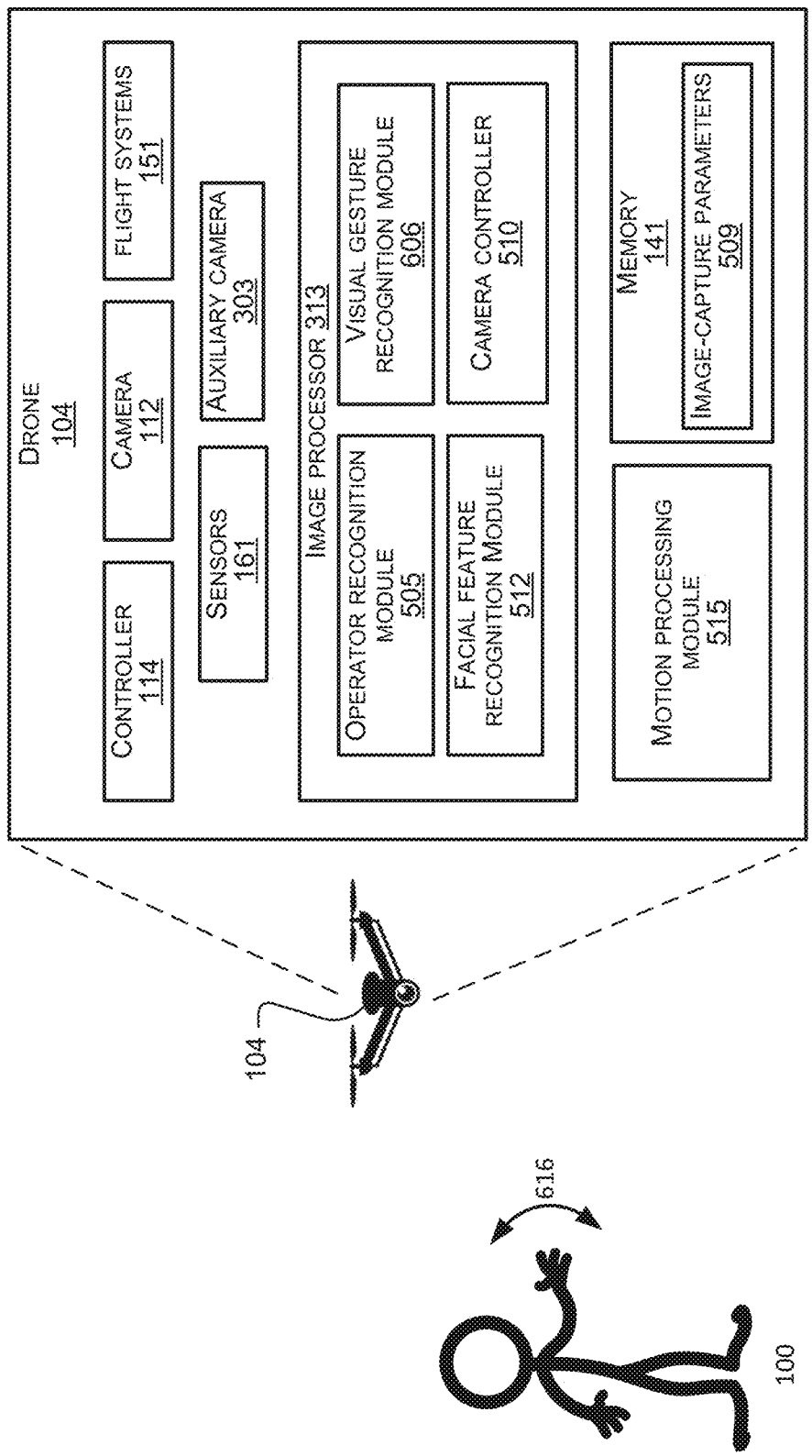
FIG. 6 is a schematic diagram illustrating a drone system with a visual gesture control channel according to some example embodiments.

FIG. 6 shows an example embodiment analogous to that of FIG. 5, with a major distinction being that the drone is configured to provide a gesture command channel by which the operator 100 can remotely control operation of the drone 104 by way of hand gestures, arm gestures, and or body gestures. In this example embodiment, the drone 104 is controllable by hand gestures, as indicated schematically by item 616 in FIG. 6. It should be borne in mind that the features discussed with reference to FIG. 6 can thus in other embodiments be employed equally with respect to the different types of visual gestures described herein. Note also, that in other examples, such visual command gestures may be performed with a visually distinctive control device. Such a visual control device may in some instances be a dedicated device sold or marketed for use with the drone 104, with a visual gesture recognition module 606 being programmed to recognize and track the visual control device. Examples of such real control devices include a brightly or uniquely colored wand, wristband, paddle, or the like.

Returning to the particular example of FIG. 6, the drone 104 includes a visual gesture recognition module 606 configured to perform image processing with respect to a video stream captured of the operator 100, to identify and track movements of the operator 100, and to recognize predefined gesture commands corresponding to the identified movements. The visual gesture recognition module 606 further automatically identifies a drone operation corresponding to the recognized gesture command, and causes execution of those gesture commands by the controller 114 and/or the camera controller 510, as the case may be.

In this example, a video stream on which automated gesture command recognition is based is captured by an auxiliary camera 303 mounted on the drone in addition to its primary camera 112. The auxiliary camera 303 is in this example embodiment a fixed wide angled camera that continuously captures a video stream in which the operator 100 is included. As described with reference to FIG. 3, the auxiliary camera 303 may in other examples be a directional camera that automatically and continuously tracks the operator based on image processing performed by the image processor 313.

Similar to what has been described in some of the previous example embodiments, the operator recognition module 505 performs automated recognition of the operator 100 in distinction to any other persons that may be present in the video stream. Such operator recognition facilitates gesture recognition, in that image processing for visual gesture recognition is limited to analysis of the movements of the identified operator. In instances where the auxiliary camera 303 is a directional camera, visual tracking of the operator 100 by the auxiliary camera 303 is facilitated by operator recognition.

Operator recognition is in this example embodiment based on preflight specification of a particular person as the operator 100. More particularly, operator recognition is in this example based on facial recognition with reference to a signature facial image of the operator 100 communicated to the drone 104 preflight. In this example, the operator recognition module 505 provides functionality of signature facial image capture and submission via the camera 112 incorporated in the drone 104. Thus, to set the drone 104 to respond to a particular person, the drone camera 112 is pointed at the face of the individual, and an imprint command is communicated to the drone 104 (in this example via a user input mechanism comprising a pushbutton on the exterior of the drone 104). Responsive to the imprint command, the camera 112 captures the facial image of the person thus identified as the operator 100, and communicates the image to the operator recognition module 505 for automated recognition of the operator 100.

In alternative embodiments, as discussed earlier, operator recognition that may be based at least in part on identification of a particular person based on a launch vector, and or on automatic identification of a visually distinctive characteristic associated with the person identified as the operator. Note also that, in other examples, the signature image on which operator recognition is based may be captured and communicated to the drone 104 by a separate electronic device, for example by way of a mobile phone 213 as described with reference to FIG. 2.

Gesture commands by way of hand gestures can in this example be communicated to the drone both preflight and in-flight. Thus, for example, the operator 100 can, before launching the drone 104, perform a specific hand gesture that is automatically recognized by the visual gesture recognition module 606 to determine at least some aspects of operation subsequently executed by the drone 104. For example, the operator 100 can make a particular hand signal associated with one of a number of different predefined flightpaths for the drone 104. The drone 104 then automatically recognizes the particular gesture command, and performs the selected flightpath subsequent to launch. Another example preflight command is selection of a particular object or person as a focal point for subsequent drone operation. Here, the operator 100 can point to a selected person before launching the drone 104, automatically causing the primary camera 112 of the drone subsequently to be trained on the indicated person.

Gesture commands can similarly be communicated to the drone 104 during flight. Such gesture commands include performance of predefined flightpath, adjustment of drone position, control of camera functions, and recall of the drone 104. It will be appreciated, again, that these example operations that are controllable by way of gesture command are not exhaustive, and that many other drone and camera functions can in other embodiments be controllable by gesture command.

The drone 104 is in this example further configured for at least some of the automated image-capture and image framing operations as described with reference to FIG. 5 and elsewhere herein. Availability of an in-flight command channel provides additional functionality as compared with the fully automated in-flight operation described with reference to FIG. 5. Thus, for example, the operator 100 can provide an in-flight gesture command for the drone 104 to capture an image of a particular person or subject, responsive to which the drone 104 automatically positions itself and arranges the camera 112 to compose the image according to predefined image-capture parameters 509 and automated image assessment performed by the image processor 313 in view of these parameters.

In this example, the image-capture parameters 509 include different parameters or settings for a predefined plurality of image types. In this particular embodiment, the predefined image types include a close-up shot, a half shot, and a group shot. The operator 100 can select a particular one of these image types by in-flight performance of a corresponding gesture command. Responsive recognizing the gesture command, the drone 104 then frames the image according to the image-capture parameters 509 of the selected image type.

The drone 104 is further enabled in this example to perform partially automated image timing. Thus, when a prospective image is ready to be captured, the operator 100 can provide a gesture command to "take the picture now." Responsive to this command, the facial feature recognition module 512 automatically monitors the facial expression(s) and the eyes of persons present in the image frame, and then times image-capture based on such facial feature recognition, as described earlier. There may thus in such cases be a slight delay between the operator command to capture the image and actual image-capture, to automatically optimize image quality.

Another example functionality enabled by the in-flight gesture command channel is that the in-flight positioning of the drone 104 can be adjusted by the operator 100 through the use of appropriate hand signals. In this example, the drone positioning can be adjusted by a back-and-forth motion of an open hand, with a direction of the position adjustment being determined by the direction in which the hand palm faces. Thus, moving the hand back and forth with palm directed towards the operator causes the drone to move closer to the operator, while the same motion with the palm directed away from the operator causes the drone 104 to move further away from the operator.

Figure 6A:
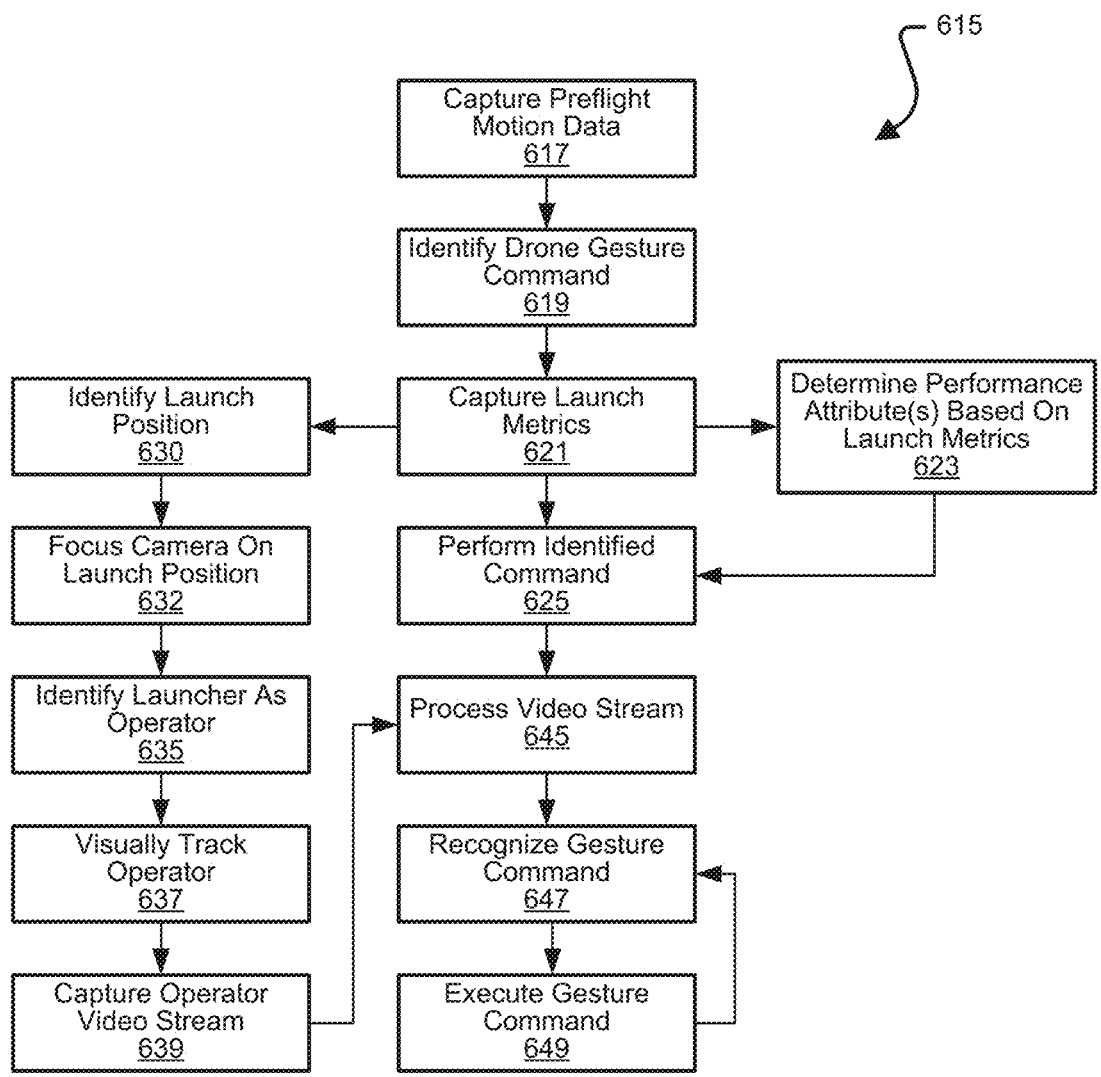
FIG. 6A is a schematic flowchart illustrating a method of controlling a drone, according to one example embodiment.

FIG. 6A shows a flow diagram 615 of a method of operating the drone 104 according to one example embodiment. Note that only some of the discussed features are illustrated with reference to the flowchart 615, and that similar methods with respect to the other functionalities discussed elsewhere herein are to be understood as forming part of this disclosure. The disclosure likewise extends to a computer readable storage medium that has stored thereon machine-readable instructions for causing one or more machines to perform, when the instructions are executed, operations comprising any of the methods and functionalities described herein.

In FIG. 6A, preflight motion data is captured, at operation 617, by the sensors 161. At operation 619, the motion data is processed by the motion processing module 515 to identify any drone gesture commands indicated by the motion data. Thus, the performance of a preflight motion with the drone 104, as described above, is in this manner identified as a command to perform specific in-flight behaviors or operations.

At launch of the drone 104, launch metrics is captured by the sensors 161, at operation 621. The launch metrics are analyzed, at operation 623, by the motion processing module 515 (e.g., by the launch metrics analyzer 517 such as in FIG. 5) to determine one or more performance attributes of the operation indicated by the preflight drone gesture. For example, the drone gesture command may indicate a particular flightpath, a while the size of the launch vector determines the dimensions of the flightpath. At operation 625, the automated operations indicated by the drone gesture command are performed with one or more attributes indicated by launch metrics.

At launch, the launch metrics are also penalized by the motion processing module 515 to determine the launch position, at operation 630. The example method of FIG. 6A is performed with a drone 104 in which the auxiliary camera 303 is a directional camera. Based on analysis of the launch vector, the auxiliary camera 303 is immediately subsequent to launch automatically focused on the launch position, at operation 632, and the person located at the launch position is automatically identified as the operator 100, at operation 635. Identification of the operator 100 in this example includes automatically identifying a distinctive visual feature associated with the operator 100 (e.g., identifying a distinctive article of clothing, accessory, or facial feature). Thereafter, the image processor 313 continually processes a video stream captured by the auxiliary camera 303 to recognize the operator 100 and to cause a visual tracking of the operator 100, at operation 637, by controlling direction of the auxiliary camera 303. In this manner an operator video stream is continuously captured, at operation 639, thus ensuring that any visual gestures performed by the operator 100 is captured in the video stream.

At operation 645, the video stream is processed by the visual gesture recognition module 606, automatically to recognize any visual gesture commands performed by the operator 100. Responsive to identification of such a gesture command, at operation 647, the operations or functions corresponding to the gesture command is automatically executed, at operation 649, by the drone 104 through operation of the drone controller 114 and/or the camera controller 510.

Figure 7:
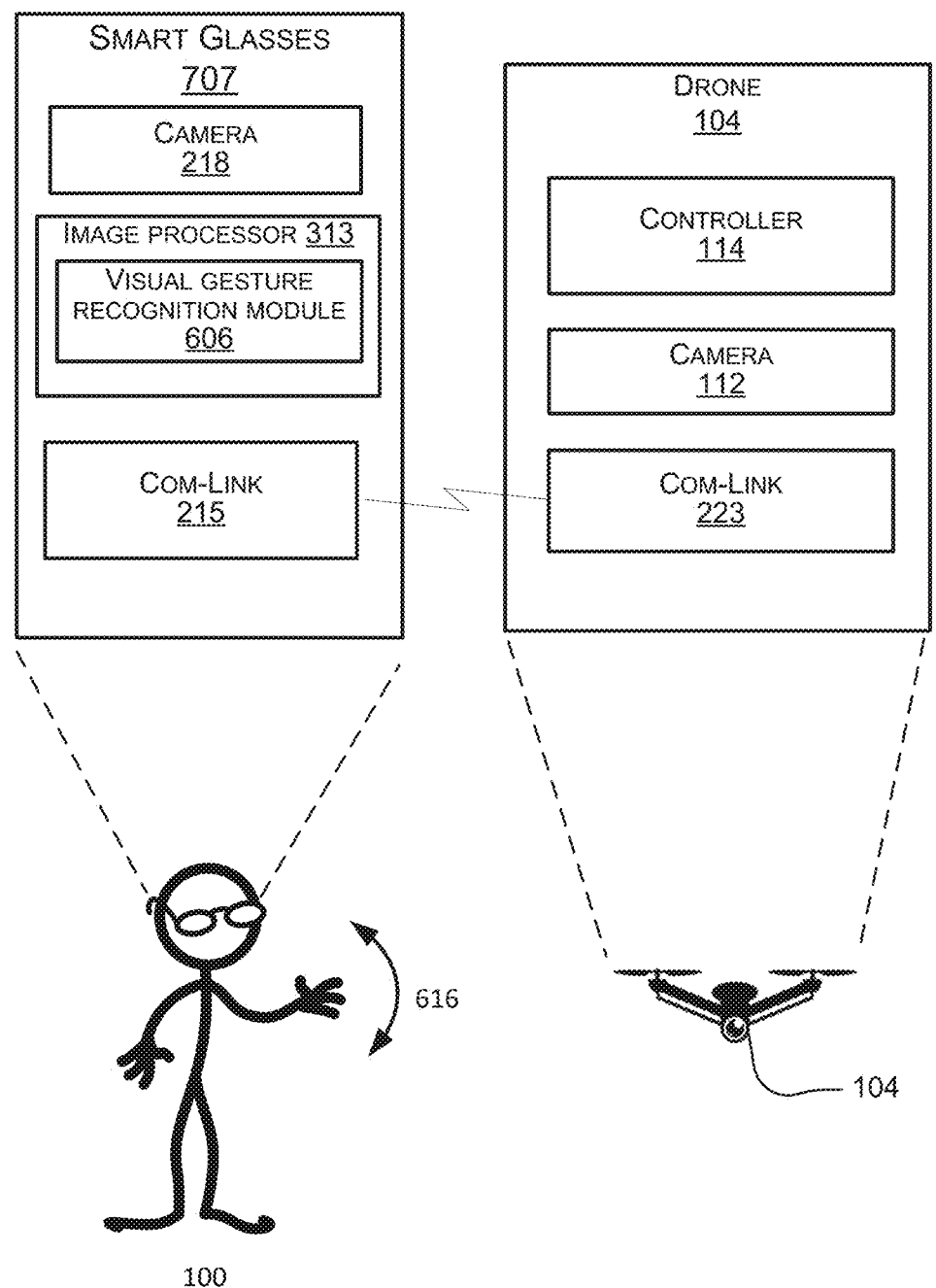
FIG. 7 is a schematic diagram illustrating a drone system with a visual gesture control channel facilitated by a personal electronic device in communication with the drone, according to some example embodiments.

FIG. 7 shows an example drone system that provides functionality analogous to that described with reference to FIG. 6, a major distinction being that capturing of a video stream for gesture recognition, as well as processing of the video stream to recognize gesture commands, are performed by a personal electronic device separate from that in communication with the drone 104. In this example embodiment, the mobile electronic device by which gesture capture and recognition is performed is in the form of a pair of smart glasses 707.

For these purposes, the smart glasses 707 includes a camera 218 (being an offboard camera with respect to the drone 104). It will be appreciated that the smart glasses 707 is electronics enabled and provides a mobile electronic device similar to the mobile phone 213 of FIG. 2. The smart glasses 707 thus has integrated computer processors which are in this example configured or configurable by execution of software stored on the phone to provide the image processor 313 and visual gesture recognition module 606 with the functionalities described with reference to FIG. 6. The smart glasses 707 include a communication link 215 that provides a wireless communication channel with a corresponding communication link 223 of the drone 104.

In use, the operator performs hand gestures as described with reference to FIG. 6. The gesture commands are, in particular, performed within the field of view of the operator 100 and are automatically included within a video stream continuously captured by the camera 218, which is directed to be aligned with the operator's direction of view. Image processing and gesture command recognition is performed at the smart glasses 707, and command signals corresponding to the recognized gestures commands are communicated to the drone.

Benefits of the architecture of FIG. 7 include that identification of command gestures in the video stream is facilitated by the camera 218 being closer to and a consistent distance from the hand signals performed by the operator 100. Additionally, processing load for gesture recognition is offloaded from the drone 104 to the smart glasses 707. Note that, in other embodiments, image processing and gesture recognition can be performed at the drone 104 (i.e., similarly to the arrangement of FIG. 6), with the smart glasses 707 communicating the video stream to the drone 104 for processing. In yet other embodiments, functionality similar to that provided by the smart glasses 707 for gesture capture and/or recognition may be provided by a different type of mobile electronic device, such as a mobile phone 213, a tablet, a PDA, or the like.

Figure 8:
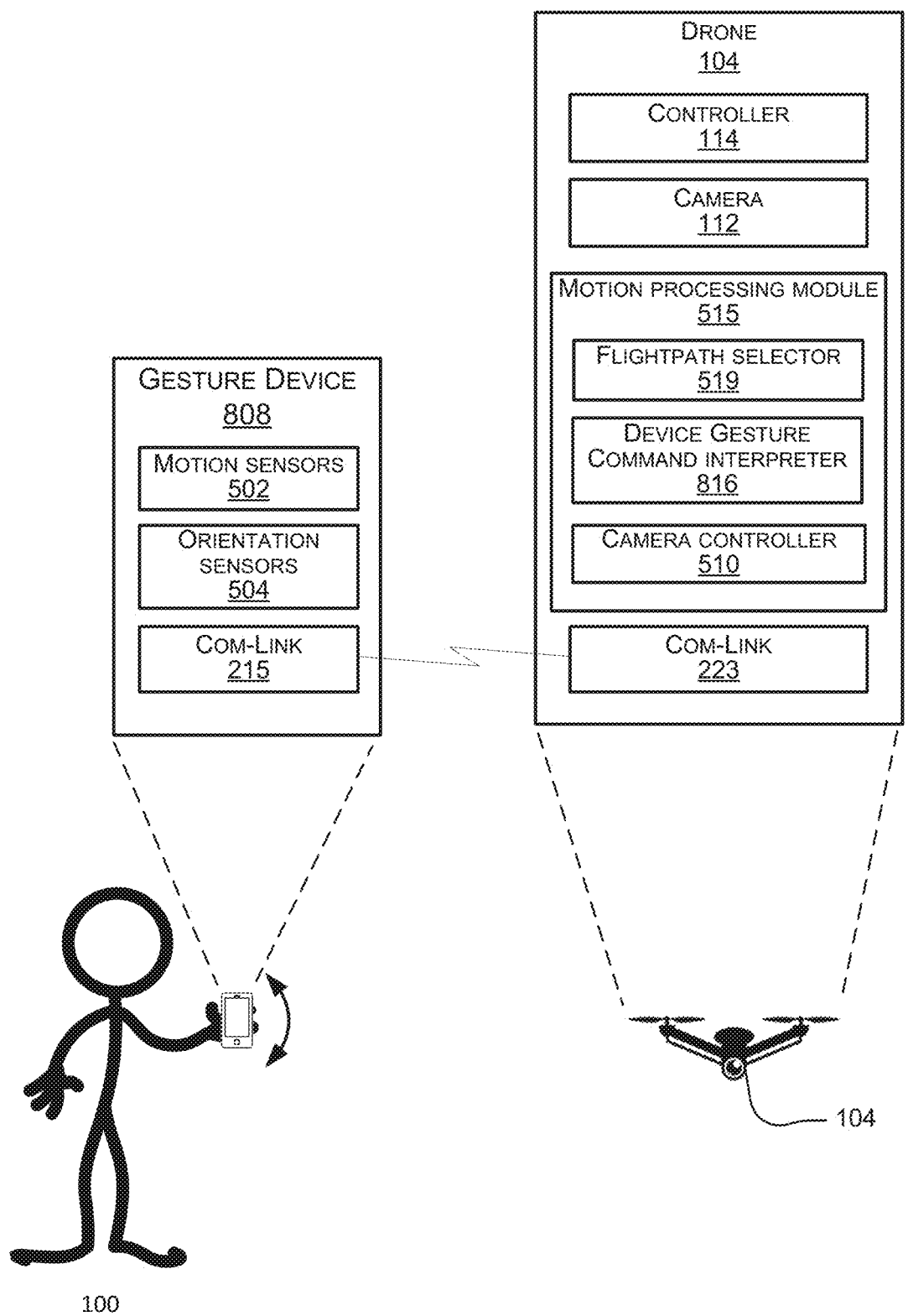
FIG. 8 is a schematic diagram illustrating a drone system for drone control via motion gestures performed with a gesture device separate from the drone, according to some example embodiments.

FIG. 8 shows an example embodiment in which a drone 104 is controllable by means of a device gesture control channel, comprising performance of command gestures with a gesture device 808. In this example embodiment, the gesture device 808 is a mobile phone such as the mobile phone 213 described with reference to FIG. 2.

It will be appreciated that, in this example, the device gesture command channel of FIG. 8 corresponds in operation and functionalities to the gesture command channel described with reference to FIGS. 6 and 7, a major distinction being that the automated recognition of gestures performed by the operator 100 is not visual (e.g., based on image processing with respect to a video stream captured of the operator 100), but is instead based on analyzing motion sensed by the gesture device 808.

To this end, the gesture device 808 includes motion sensors 502 and orientation sensors 504 to capture motion data indicating motions imparted to the gesture device 808 by the operator 100. The motion data is communicated to the drone 104 in real time via the communication links 215 and 223. The motion data is processed by a device gesture command interpreter 816 forming part of a motion processing module 515, thereby identifying any predefined device gesture commands captured by the motion data. In other embodiments, the motion processing module 515 may be provided on the gesture device 808, so that control information communicated from the gesture device 808 comprises command signals rather than the motion data communicated in the example of FIG. 8.

As described in a previous portion of the description, the gesture device can in other embodiments be provided not by a multifunctional gesture device, as is the case in FIG. 8, but by a dedicated gesture control device. Examples of such dedicated to gesture control devices include a motion-sensitive wristbands, rings, and handheld devices (e.g., a wand).

A benefit of a gesture device command channel such as that of FIG. 8, as compared to a visual gesture command channel such as that of FIG. 7, is that the motion processing is less resource intensive and image processing, while sensing the motion of a gesture device is generally more reliable and less likely to error than the image-based recognition of gestures.

Figure 9:
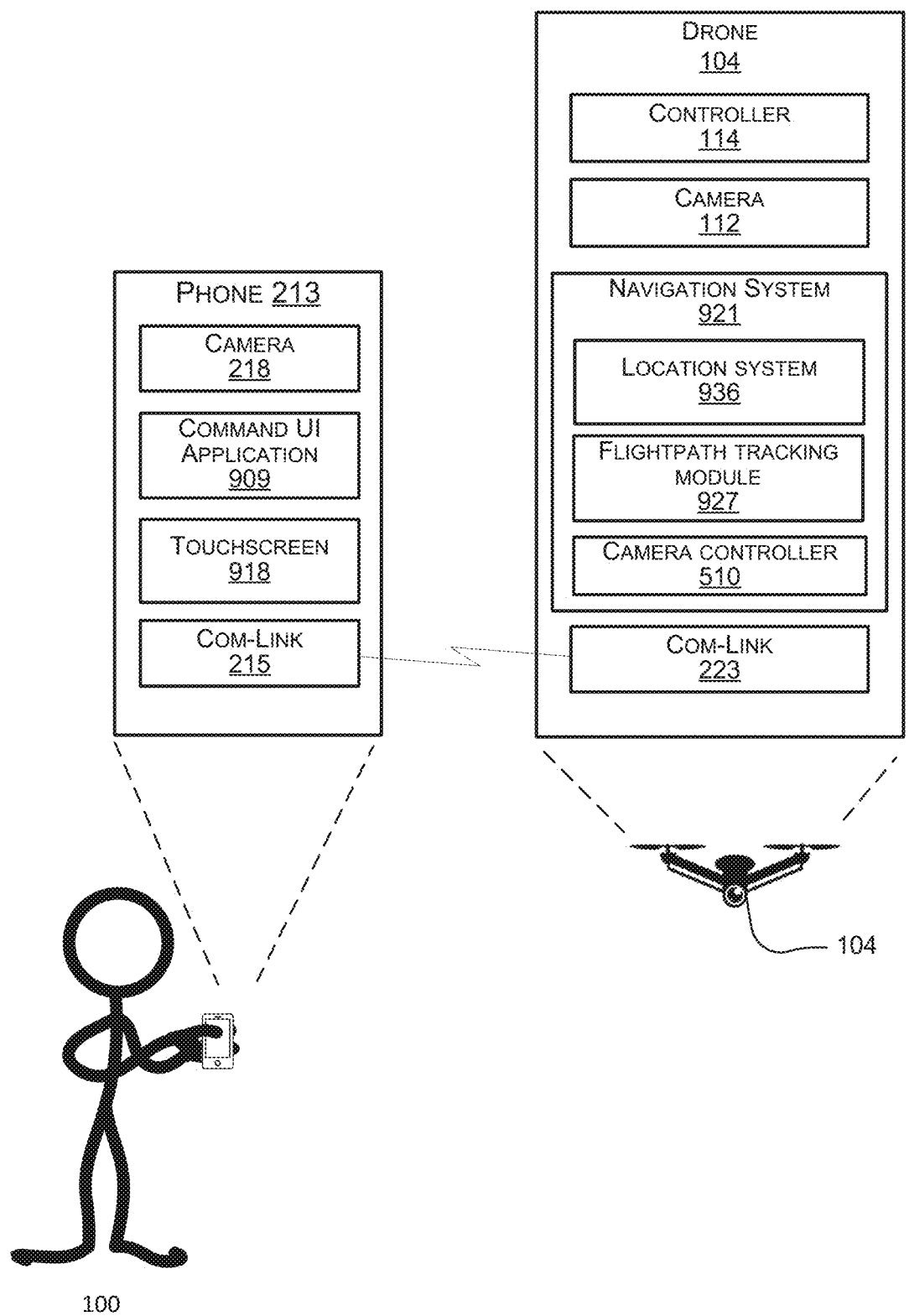
FIG. 9 is a schematic diagram illustrating a drone system that provides for drone control via a command user interface on a mobile device separate from the drone, according to some example embodiments
Figure 9A:
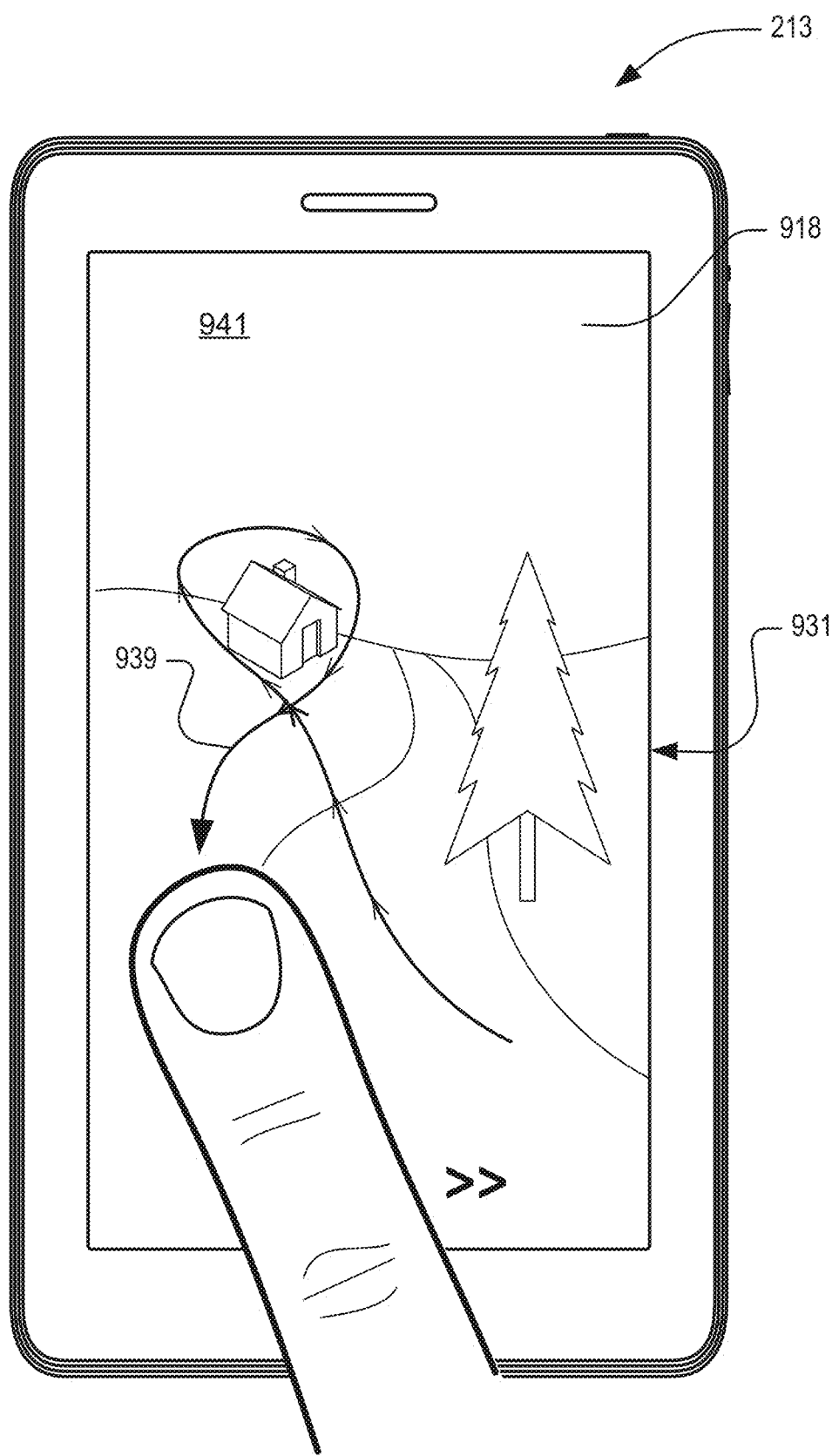
FIGS. 9A and 9B are simplified to use of respective command user interfaces provided on a mobile electronic device consistent with the embodiment of FIG. 9, according to some example embodiments.
Figure 9B:
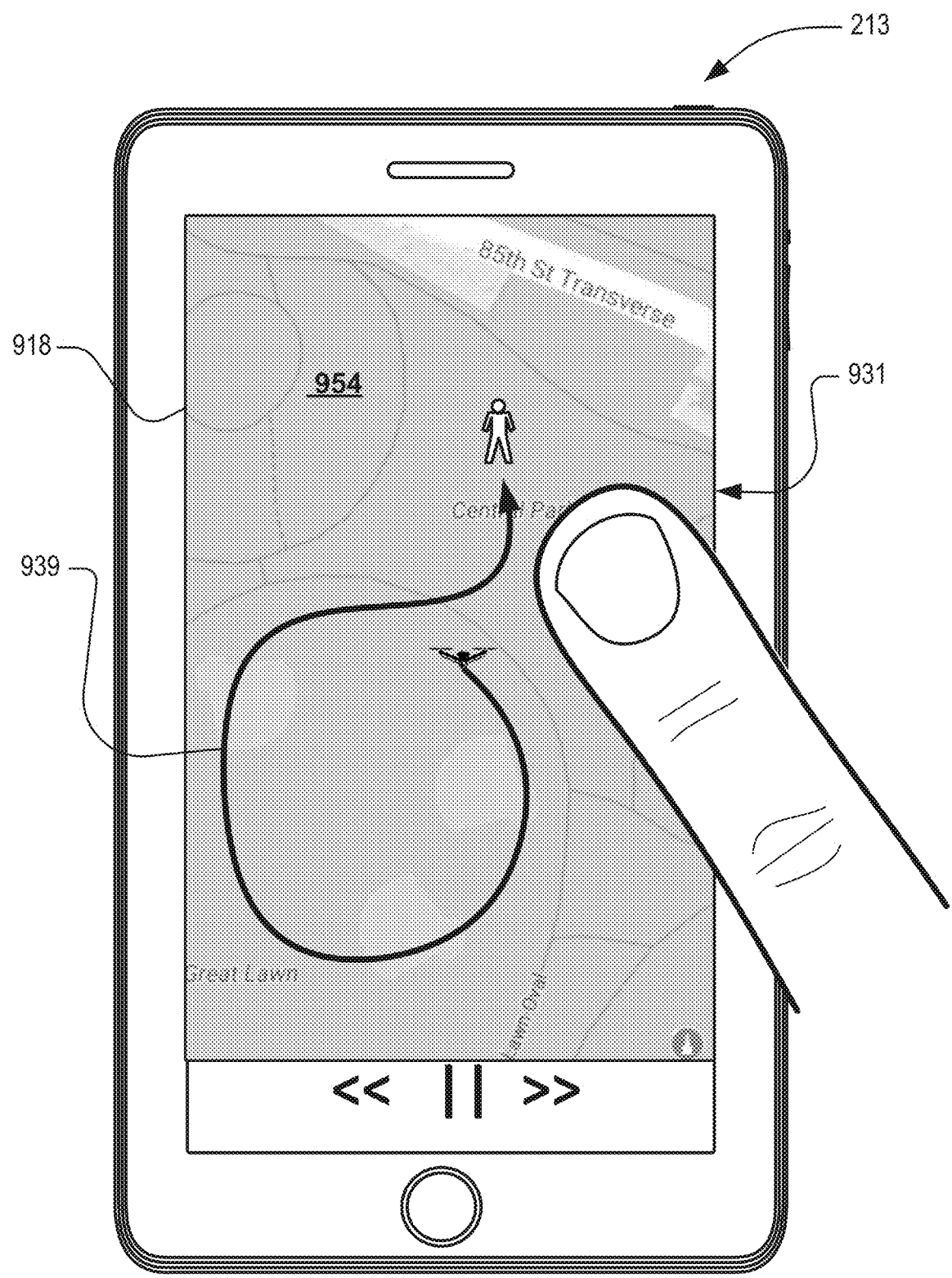

FIG. 9 shows an example of a drone system that provides a command user interface (UI) on a multifunctional mobile electronic device, in this example embodiment being a mobile phone 213. Examples of such a command UI 931 provided by the system of FIG. 9 are illustrated in FIGS. 9A and 9B.

In this example, the phone 213 is configured for providing the command UI 931 by executing a command UI application 909, thus providing a graphical user interface (GUI) via a touchscreen 918 of the phone 213. In conventional fashion, the touchscreen 918 is a display screen that is touch sensitive for receiving haptic user input. The mobile phone 213 is in communication with the drone 104 via respective communication links 215, 223 (which may be either a direct connection such as by Bluetooth or Wi-Fi, or may be an indirect connection such as via a mobile telephone network or the Internet).

The drone 104 includes a navigation system 921 comprising one or more computer processors configured to guide movement of the drone relative to the geolocation and/or relative to objects in the ambient environment. The navigation system 921 comprises a location system 936 determine the current location of the drone 104. In this example embodiment, the location system 936 comprises a global positioning system (GPS). The drone 104 further comprises a flightpath tracking module 927 configured to continually compare a current position of the drone 104 with a predefined flightpath 939 specified by the user via the command UI 931, thus enabling the drone 104 physically to follow the specified flightpath 939.

The command UI 931 may provide for user guidance or flightpath definition on a visual representation of an ambient environment in which the drone 104 is located. In the example of FIG. 9A, the visual representation of the ambient environment is provided in the form of a photographic image or depth picture 941 of the area in which the drone 104 is currently located. In some embodiments, the picture 941 can be captured by the mobile phone 213. In this embodiment, however, the picture 941 is captured by the drone camera 112 and is communicated substantially in real-time to the phone 213 for display as part of the command UI 931.

The operator 100 can direct movement of the drone 104 by haptic engagement with the touchscreen 918. In this example, the operator 100 can trace a flightpath 939 for the drone 104 in the command UI 931, such that the flightpath 939 overlays the environmental picture 941.

Responsive to provision of such a flightpath 939, the drone 104 autonomously travels along the defined flightpath 939 under guidance of the navigation system 921. Configuration of the drone 104 along the specified flightpath 939 in this example comprises image processing on the picture 941 of which the flightpath 939 is overlaid in the command UI 931, to automatically recognize one or more objects in the drone's environment. In the example shown in FIG. 9A, such image processing by the navigation system 921 automatically recognizes a tree and a house. Subsequent navigation and movement control by the flightpath tracking module 927 likewise comprises continual object recognition of imagery captured by the drone camera 112, to use the environmental objects thus recognized as references relative to which movement of the drone 104 is to occur.

In one example embodiment, the drone 104 and/or the mobile phone 213 is configured to generate a depth image or depth map for the picture 941 that is presented as part of the command UI 931. Such three-dimensional information with respect to the two-dimensional presented image can be acquired or generated in known methods that include, for example, structure from motion for the capturing of stereoscopic images with a pair of closely spaced cameras. Imagery for such structure from motion or stereoscopic construction of the depth map for the image is in some example embodiments captured by the mobile phone 213, and is in other embodiments captured by the drone 104. Based on the depth map, every point of the inputted flightpath 939 is mapped to a corresponding three-dimensional point, based on which automated following of the flightpath 939 is executed.

In the embodiment of FIG. 9B, the visual representation of the drone environment displayed in the command UI 931 is a map 954. The command UI application 909 is in this example configured to employ map information from a native or accessible map application (e.g., Google of Apple's map apps).

In conventional fashion, the mobile phone 213 includes a GPS device and is in communication with the Internet. The command UI application 909 is therefore an possession of location information both for itself (and therefore by extension for the operator 100) and for the drone 104 with which it is in communication. The command UI 931 is in this example configured automatically display the map 954 such that centered on the current drone location (represented on the map by a drone icon). The command UI 931 additionally displays an operator icon corresponding to the location of the mobile phone 213.

The operator can thereafter specify a flightpath to be followed by the drone 104 by tracing the flightpath 939 over the map 954. The display in the command UI 931 is updated to show the thus inputted flightpath 939 overlaid on the map 954.

The navigation system 921 thereafter guides the drone 104 along the specified flightpath 939 based on updated GPS location information provided by the location system 936 compared to location information for the defined flightpath, as implemented by the flightpath tracking module 927.

The command UI 931 can in some embodiments provide additional drone guidance functionalities. One example includes definition of a homing location to which the drone is to return. In this example, such a homing command is provided by double tapping at the desired location on the map 954 displayed on the touchscreen 918. It will be appreciated that different commands can in various embodiments be communicated by different predefined haptic gestures and taps.

Figure 10:
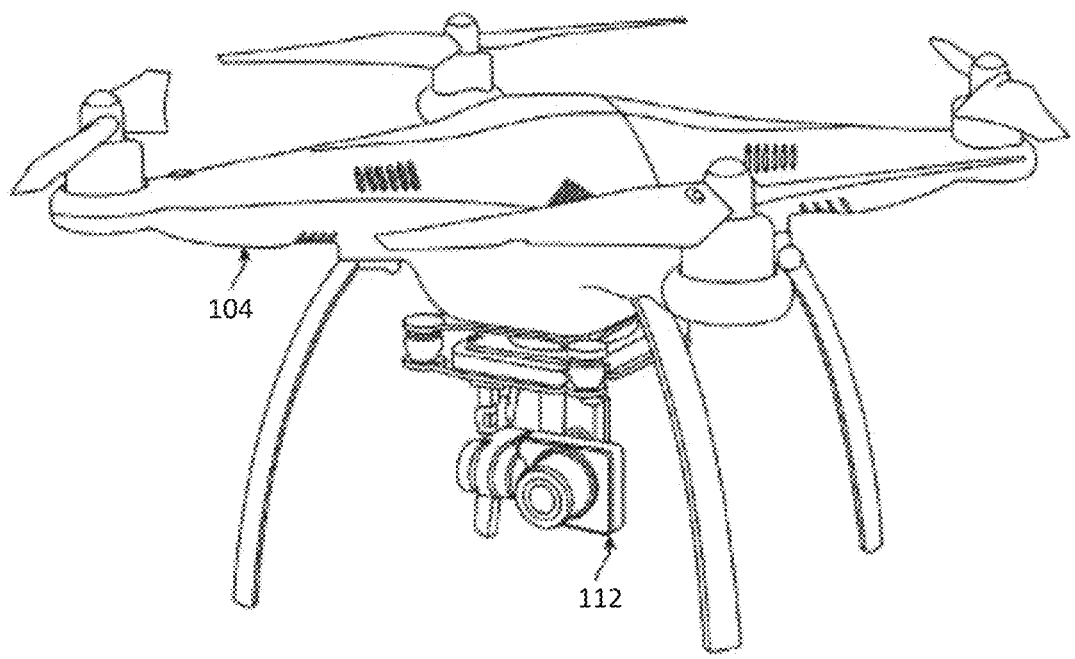
FIG. 10 is a schematic three-dimensional view of a camera-enabled drone in accordance with one example embodiment.

FIG. 10 is a simplified three-dimensional representation of an example UAV or drone 104, according to an example embodiment. The drone 104 is in this example a quadcopter having a body housing an electrically powered drive mechanism to drive four rotors in order to provide aerodynamic lift to the drone 104, as well as to accelerate and rotate the drone 104. The drone 104 further includes a camera 112. The camera 112 is in this example movably mounted on the drone body, being coupled to the body via one or more actuators or other mechanisms to control orientation of the camera 112 relative to the drone body.

Figure 11:
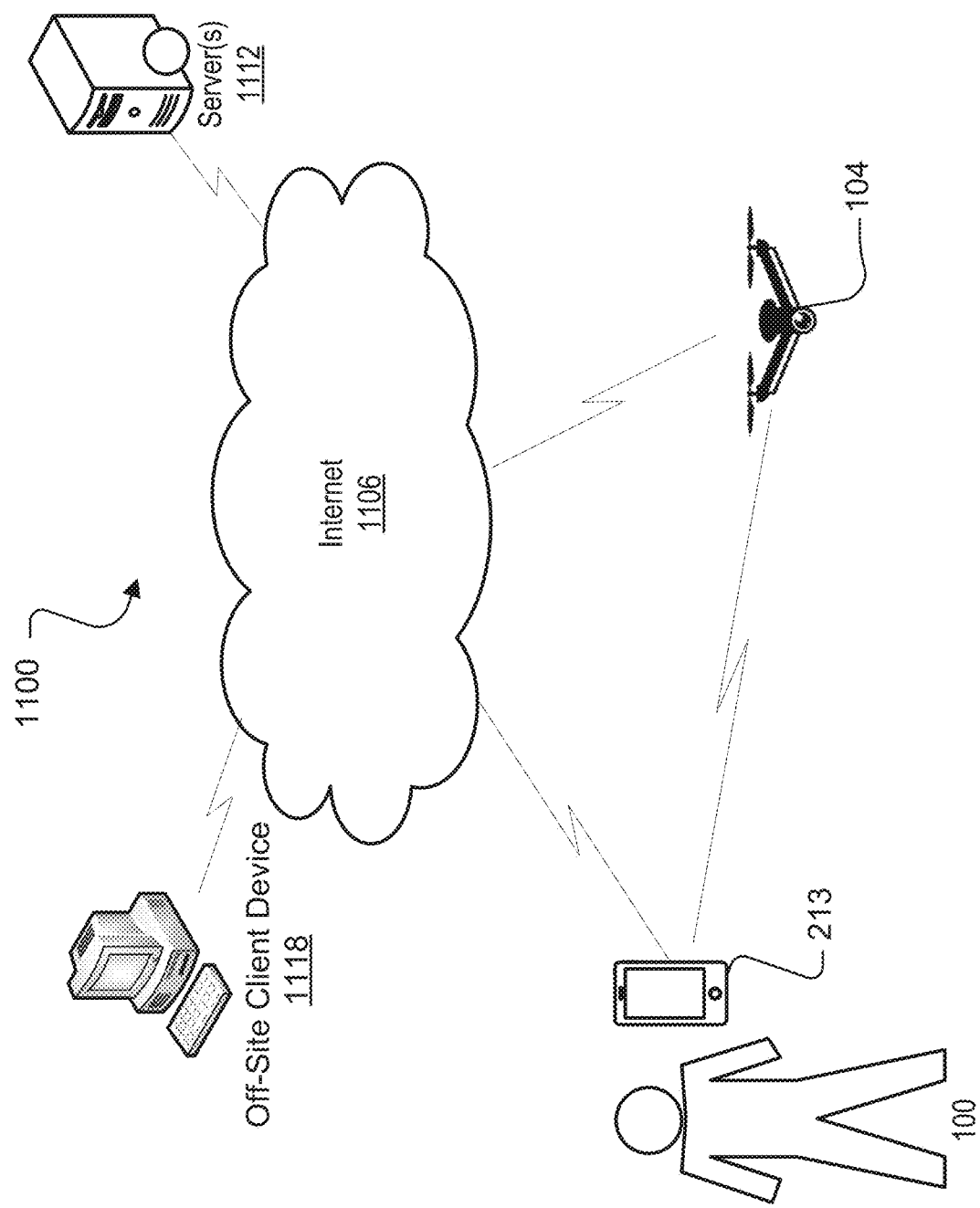
FIG. 11 is a schematic diagram of a networked system for controlling and communicating with a drone, according to an example embodiment.

FIG. 11 is a schematic diagram illustrating a drone system 1100 of which a drone 104 such as that previously described may in some embodiments form part. In embodiments such as that shown in FIG. 11, the drone 104 may, instead of or in addition to an on-site control device (e.g., mobile phone 213), be communicatively coupled via a distributed network (e.g., the Internet 1106), to one or more off-site client devices 1118 and/or to one or more servers 1112 providing various online services. In some instances, communication between the on-site remote control device 213 and the drone 104 may be via the Internet 1106 (e.g., by means of a cellular telephone network). In some embodiments, the server 1112 may provide a social networking service, to enable communication of content (e.g., photos, videos, status updates, media content messages, and the like) directly to a social media sites such as Facebook or SnapChat from the drone 104, in flight.

Figure 12:
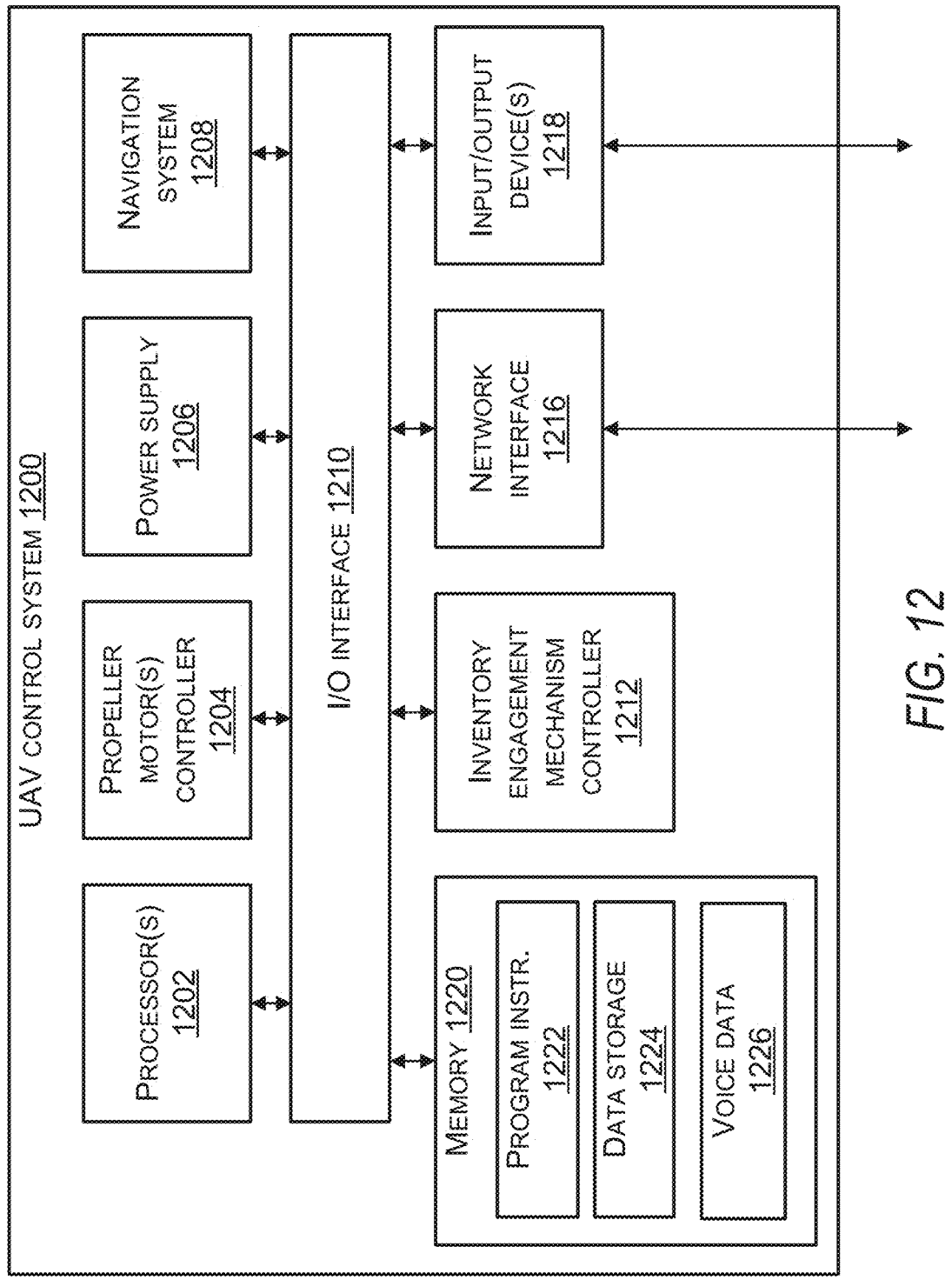
FIG. 12 is a schematic diagram of functional components of a drone in accordance with some example embodiments.

FIG. 12 is a block diagram illustrating an example UAV control system 1200 of a UAV such as the drone 104 previously described with reference to various example embodiments. In various examples, the block diagram may be illustrative of one or more aspects of the UAV control system 1200 that may be used to implement the various systems and methods discussed above. In the illustrated implementation, the UAV control system 1200 includes one or more processors 1202, coupled to a non-transitory computer readable storage medium in the form of a memory 1220 via an input/output (I/O) interface 1210. The UAV control system 1200 may also include a propeller motor controller 1204, such as an electronic speed control (ESC), a power supply 1206 and/or a navigation system 1208. The UAV control system 1200 further includes an inventory engagement mechanism controller 1212, a network interface 1216, and one or more input/output devices 1218.

In various implementations, the UAV control system 1200 may be a uniprocessor system including one processor 1202, or a multiprocessor system including several processors 1202 (e.g., two, four, eight, or another suitable number). The processor(s) 1202 may be any suitable processor capable of executing instructions. For example, in various implementations, the processor(s) 1202 may be general-purpose or embedded processors implementing any of a variety of instruction set architectures (ISAs), such as the x86. PowerPC, SPARC, or MIPS ISAs. or any other suitable ISA. In multiprocessor systems, each processor(s) 1202 may commonly, but not necessarily, implement the same ISA.

The non-transitory computer readable storage medium 1220 may be configured to store executable instructions, data, navigation paths and/or data items accessible by the processor(s) 1202. In various implementations, the nontransitory computer readable storage medium 1220 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 1220 as program instructions 1222, data storage 1224 and voice data 1226, respectively. In other implementations, program instructions, data and/or voice data may be received, sent or stored upon different types of computer-accessible media, such as non-transitory media, or on similar media separate from the non-transitory computer readable storage medium 1220 or the UAV control system 1200. Generally speaking, a non-transitory, computer readable storage medium may include storage media or memory media such as magnetic or optical media, e.g., disk or CD/DVDROM, coupled to the UAV control system 1200 via the I/O interface 1210. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 1216.

In one implementation, the I/O interface 1210 may be configured to coordinate I/O traffic between the processor(s) 1202, the non-transitory computer readable storage medium 1220, and any peripheral devices, the network interface 1210 or other peripheral interfaces, such as input/output devices 1218. In some implementations, the I/O interface 1210 may perform any necessary protocol, timing or other data transformations to convert data signals from one component (e.g., non-transitory computer readable storage medium 1220) into a format suitable for use by another component (e.g., processor(s) 1202). In some implementations, the I/O interface 1210 may include support for devices attached through various types of peripheral buses, such as a variant of the Peripheral Component Interconnect (PCI) bus standard or the Universal Serial Bus (USB) standard, for example. In some implementations, the function of the I/O interface 1210 may be split into two or more separate components, such as a north bridge and a south bridge, for example. Also, in some implementations, some or all of the functionality of the I/O interface 1210, such as an interface to the non-transitory computer readable storage medium 1220, may be incorporated directly into the processor(s) 1202.

The propeller motor(s) controller 1204 communicates with the navigation system 1208 and adjusts the power of each propeller motor to guide the UAV along a determined navigation path to a delivery location. The navigation system 1208 may include a GPS or other similar system than can be used to navigate the UAV to and/or from a delivery location. The inventory engagement mechanism controller 1212 communicates with the motor(s) (e.g., a servo motor) used to engage and/or disengage inventory. For example, when the UAV is positioned over a level surface at a delivery location, the inventory engagement mechanism controller 1212 may provide an instruction to a motor that controls the inventory engagement mechanism to release the inventory.

The network interface 1216 may be configured to allow data to be exchanged between the UAV control system 1200, other devices attached to a network, such as other computer systems, and/or with UAV control systems of other UAVs. For example, the network interface 1216 may enable wireless communication between numerous UAVs that are transporting inventory to various delivery destinations. In various implementations, the network interface 1216 may support communication via wireless general data networks, such as a Wi-Fi network. For example, the network interface 1216 may support communication via telecommunications networks such as cellular communication networks, satellite networks, and the like.

Input/output devices 1218 may, in some implementations, include one or more displays, image capture devices, thermal sensors, infrared sensors, time of flight sensors, accelerometers, pressure sensors, weather sensors, etc. Multiple input/output devices 1218 may be present and controlled by the UAV control system 1200. One or more of these sensors may be utilized to assist in the landing as well as avoid obstacles during delivery and/or engagement of inventory. For example, utilizing a location signal from the GPS receiver and one or more IR sensors, the UAV may safely land on a location designated by the user. The IR sensors may be used to provide real-time data to assist the UAV in avoiding moving/movable obstacles.

As shown in FIG. 12, the memory 1220 may include program instructions 1222 which may be configured to implement the example processes and/or sub-processes described above. The data storage 1224 may include various data stores for maintaining data items that may be provided for determining navigation paths, retrieving inventory, landing, identifying a level surface for disengaging inventory, etc.

In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Software Architecture

Figure 13:
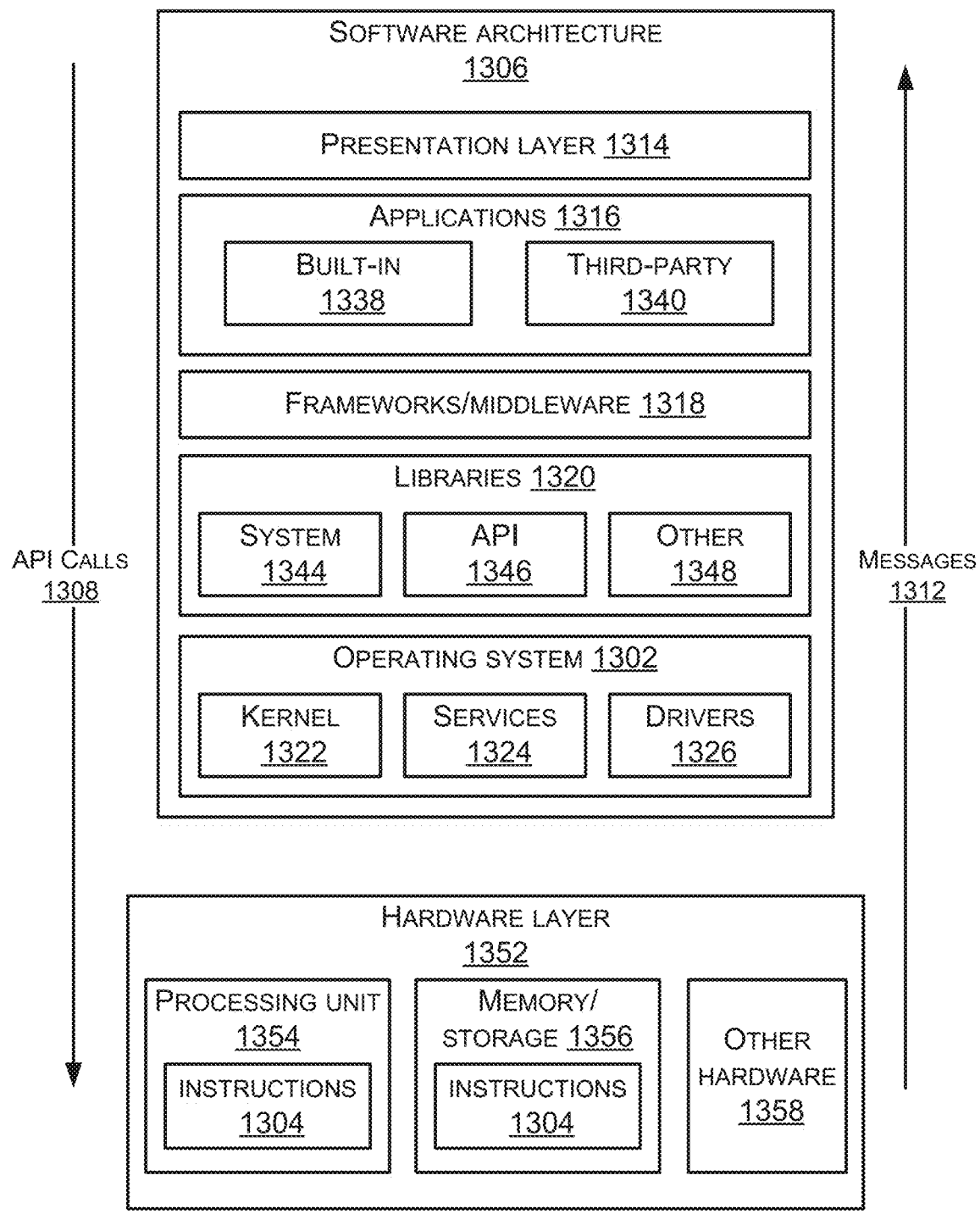
FIG. 13 is a block diagram illustrating a representative software architecture, which may be used in conjunction with various hardware architectures herein described.

FIG. 13 is a block diagram illustrating an example software architecture 1306, which may be used in conjunction with various hardware architectures herein described. FIG. 13 is a non-limiting example of a software architecture and it will be appreciated that many other architectures may be implemented to facilitate the functionality described herein. The software architecture 1306 may execute on hardware such as machine 1400 of FIG. 14 that includes, among other things, processors 1404, memory 1414, and I/O components 1418. A representative hardware layer 1352 is illustrated and can represent, for example, the machine 1400 of FIG. 14. The representative hardware layer 1352 includes a processing unit 1354 having associated executable instructions 1304. Executable instructions 1304 represent the executable instructions of the software architecture 1306, including implementation of the methods, components and so forth described herein. The hardware layer 1352 also includes memory and/or storage modules memory/storage 1356, which also have executable instructions 1304. The hardware layer 1352 may also comprise other hardware 1358.

In the example architecture of FIG. 13, the software architecture 1306 may be conceptualized as a stack of layers where each layer provides particular functionality. For example, the software architecture 1306 may include layers such as an operating system 1302, libraries 1320, applications 1316 and a presentation layer 1314. Operationally, the applications 1316 and/or other components within the layers may invoke application programming interface (API) API calls 1308 through the software stack and receive a response as in response to the API calls 1308. The layers illustrated are representative in nature and not all software architectures have all layers. For example, some mobile or special purpose operating systems may not provide a frameworks/middleware 1318, while others may provide such a layer. Other software architectures may include additional or different layers.

The operating system 1302 may manage hardware resources and provide common services. The operating system 1302 may include, for example, a kernel 1322, services 1324 and drivers 1326. The kernel 1322 may act as an abstraction layer between the hardware and the other software layers. For example, the kernel 1322 may be responsible for memory management, processor management (e.g., scheduling), component management, networking, security settings, and so on. The services 1324 may provide other common services for the other software layers. The drivers 1326 are responsible for controlling or interfacing with the underlying hardware. For instance, the drivers 1326 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1320 provide a common infrastructure that is used by the applications 1316 and/or other components and/or layers. The libraries 1320 provide functionality that allows other software components to perform tasks in an easier fashion than to interface directly with the underlying operating system 1302 functionality (e.g., kernel 1322, services 1324 and/or drivers 1326). The libraries 1320 may include system libraries 1344 (e.g., C standard library) that may provide functions such as memory allocation functions, string manipulation functions, mathematical functions, and the like. In addition, the libraries 1320 may include API libraries 1346 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1320 may also include a wide variety of other libraries 1348 to provide many other APIs to the applications 1316 and other software components/modules.

The frameworks/middleware 1318 (also sometimes referred to as middleware) provide a higher-level common infrastructure that may be used by the applications 1316 and/or other software components/modules. For example, the frameworks/middleware 1318 may provide various graphic user interface (GUI) functions, high-level resource management, high-level location services, and so forth. The frameworks/middleware 1318 may provide a broad spectrum of other APIs that may be utilized by the applications 1316 and/or other software components/modules, some of which may be specific to a particular operating system 1302 or platform.

The applications 1316 include built-in applications 1338 and/or third-party applications 1340. Examples of representative built-in applications 1338 may include, but are not limited to, a contacts application, a browser application, a book reader application, a location application, a media application, a messaging application, and/or a game application. Third-party applications 1340 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1340 may invoke the API calls 1308 provided by the mobile operating system (such as operating system 1302) to facilitate functionality described herein.

The applications 1316 may use built in operating system functions (e.g., kernel 1322, services 1324 and/or drivers 1326), libraries 1320, and frameworks/middleware 1318 to create user interfaces to interact with users of the system. Alternatively, or additionally, in some systems interactions with a user may occur through a presentation layer, such as presentation layer 1314. In these systems, the application/component "logic" can be separated from the aspects of the application/component that interact with a user.

Figure 14:
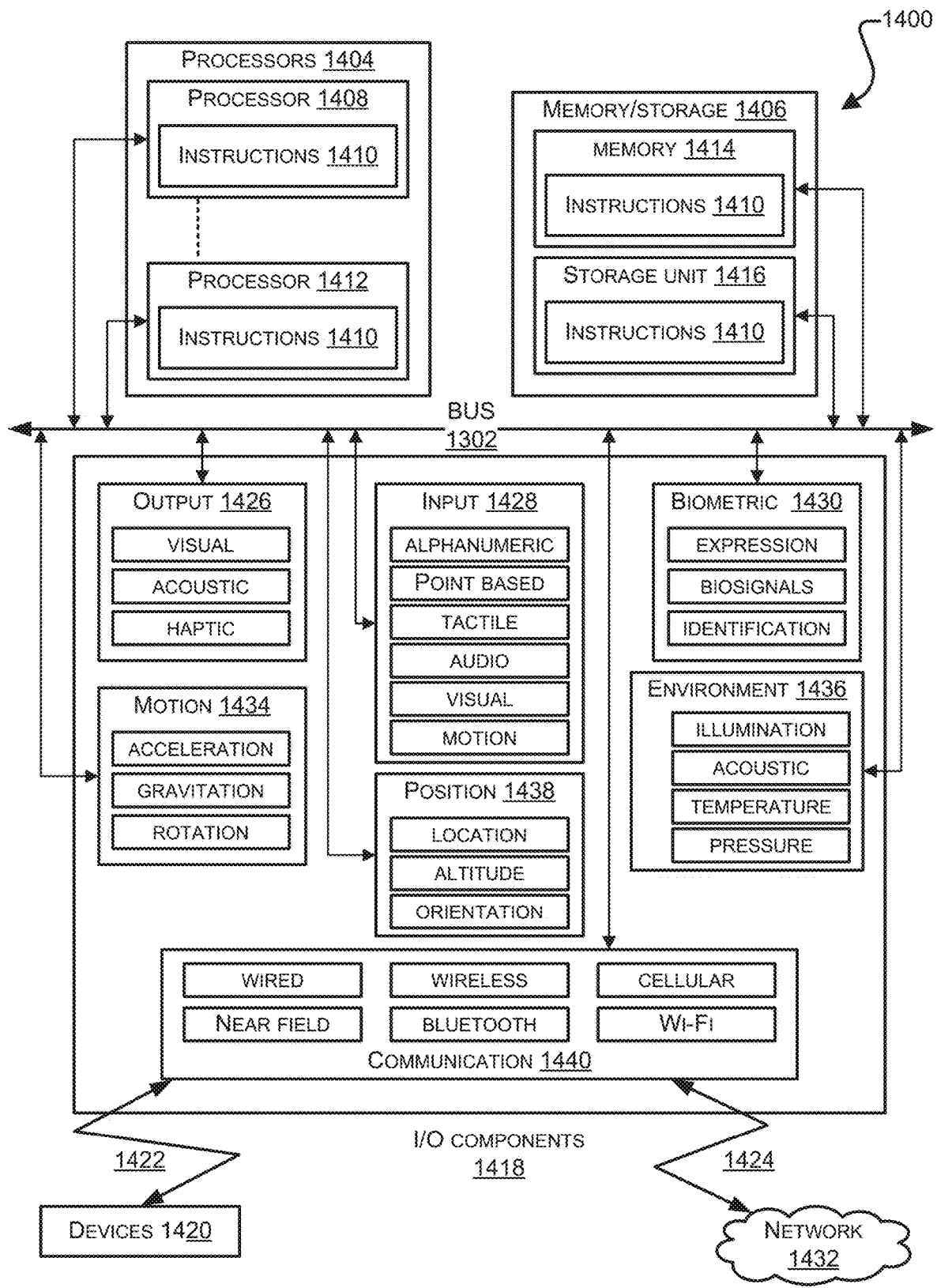
FIG. 14 is a block diagram illustrating components of a machine, according to some example embodiments, able to read instructions from a machine-readable medium (e.g., a machine-readable storage medium) and perform any one or more of the methodologies discussed herein.

FIG. 14 is a block diagram illustrating components of a machine 1400, according to some example embodiments, able to read instructions from a machine-readable medium (e.g., a machine-readable storage medium) and perform any one or more of the methodologies discussed herein. Specifically, FIG. 14 shows a diagrammatic representation of the machine 1400 in the example form of a computer system, within which instructions 1410 (e.g., software, a program, an application, an applet, an app, or other executable code) for causing the machine 1400 to perform any one or more of the methodologies discussed herein may be executed. As such, the instructions 1410 may be used to implement modules or components described herein. The instructions 1410 transform the general, non-programmed machine 1400 into a particular machine 1400 programmed to carry out the described and illustrated functions in the manner described. In alternative embodiments, the machine 1400 operates as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1410, sequentially or otherwise, that specify actions to be taken by machine 1400. Further, while only a single machine 1400 is illustrated, the term "machine" shall also be taken to include a collection of machines that individually or jointly execute the instructions 1410 to perform any one or more of the methodologies discussed herein.

The machine 1400 may include processors 1404, memory memory/storage 1406, and I/O components 1418, which may be configured to communicate with each other such as via a bus 1402. The memory/storage 1406 may include a memory 1414, such as a main memory, or other memory storage, and a storage unit 1416, both accessible to the processors 1404 such as via the bus 1402. The storage unit 1416 and memory 1414 store the instructions 1410 embodying any one or more of the methodologies or functions described herein. The instructions 1410 may also reside, completely or partially, within the memory 1414, within the storage unit 1416, within at least one of the processors 1404 (e.g., within the processor's cache memory), or any suitable combination thereof, during execution thereof by the machine 1400. Accordingly, the memory 1414, the storage unit 1416, and the memory of processors 1404 are examples of machine-readable media.

The I/O components 1418 may include a wide variety of components to receive input, provide output, produce output, transmit information, exchange information, capture measurements, and so on. The specific I/O components 1418 that are included in a particular machine 1400 will depend on the type of machine. For example, portable machines such as mobile phones will likely include a touch input device or other such input mechanisms, while a headless server machine will likely not include such a touch input device. It will be appreciated that the I/O components 1418 may include many other components that are not shown in FIG. 14. The I/O components 1418 are grouped according to functionality merely for simplifying the following discussion and the grouping is in no way limiting. In various example embodiments, the I/O components 1418 may include output components 1426 and input components 1428. The output components 1426 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1428 may include alphanumeric input components (e.g., a keyboard, a touch screen configured to receive alphanumeric input, a photo-optical keyboard, or other alphanumeric input components), point based input components (e.g., a mouse, a touchpad, a trackball a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1418 may include biometric components 1430, motion components 1434, environmental environment components 1436, or position components 1438 among a wide array of other components. For example, the biometric components 1430 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1434 may include acceleration sensor components (e.g., accelerometer), gravitation sensor components, rotation sensor components (e.g., gyroscope), and so forth. The environment components 1436 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1438 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1418 may include communication components 1440 operable to couple the machine 1400 to a network 1432 or devices 1420 via coupling 1424 and coupling 1422 respectively. For example, the communication components 1440 may include a network interface component or other suitable device to interface with the network 1432. In further examples, communication components 1440 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1420 may be another machine or any of a wide variety of peripheral devices (e.g., a peripheral device coupled via a Universal Serial Bus (USB)).

Moreover, the communication components 1440 may detect identifiers or include components operable to detect identifiers. For example, the communication components 1440 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1440, such as, location via Internet Protocol (IP) geo-location, location via Wi-Fi® signal triangulation, location via detecting a NFC beacon signal that may indicate a particular location, and so forth.

GLOSSARY

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology. Enhanced Data rates for GSM Evolution (EDGE) technology, third Generation Partnership Project (3GPP) including 3G, fourth generation wireless (4G) networks. Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein. "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network being the k (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"MACHINE-READABLE MEDIUM" in this context refers to a component, device or other tangible media able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"PROCESSOR" in this context refers to any circuit or virtual circuit (a physical circuit emulated by logic executing on an actual processor) that manipulates data values according to control signals (e.g., "commands", "op codes". "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the disclosed matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   at an aerial drone, capturing an audio stream that includes speech by an operator of the drone, the drone carrying a main camera for capturing user-consumable image and/or video content;
   while the main camera is directed to and capturing user-consumable image and/or video content of a target separate from the operator, automatically and continuously directing an auxiliary camera carried by the drone towards the operator, the auxiliary camera being movably mounted on a body of the drone, the automatic directing of the auxiliary camera comprising movement of the auxiliary camera independent of the drone body;
   using the auxiliary camera, capturing a video stream that includes facial features of the operator, the video stream being synchronized with the audio stream;
   in an automated operation performed using one or more computer processors configured therefor, performing speech recognition processing with respect to the audio stream, the speech recognition processing including and being based at least in part on image processing with respect to the video stream;
   based on the speech recognition processing, identifying in the audio stream a voice command issued by the operator with respect to operation of the drone; and
   in an automated procedure responsive to identification of the voice command, causing execution by the drone of one or more operations corresponding to the identified voice command.

2. The method of claim 1, wherein the audio stream includes a plurality of voice streams produced by different respective persons, the method further comprising:
   performing automated voice recognition to identify a particular one of the voice streams as an operator voice stream; and
   performing the speech recognition processing and the voice command identification exclusively with respect to the operator voice stream.

3. The method of claim 2, wherein the automated voice recognition comprises:
   comparing of the respective voice streams in the audio stream to a previously registered voice signature associated with the operator; and identifying as the operator voice stream that one of the plurality of voice streams of that most closely corresponds to the voice signature.

4. The method of claim 2, wherein the identifying of the operator voice stream is based at least in part on relative loudness values for the respective voice streams in the audio stream, a loudest one of the voice streams automatically being identified as the operator voice stream.

5. The method of claim 1,
wherein the audio stream includes a plurality of voice streams and the video stream includes a plurality of faces, the identifying of the voice command in the audio stream being based at least in part on identifying, by the image processing, speech events by the operator.

6. The method of claim 5, wherein the identifying of the voice command based on the image processing comprises limiting speech recognition to voice signals in the audio stream that coincide with the identified speech events by the operator.

7. The method of claim 1, wherein the voice command and the one or more operations corresponding thereto are with respect to at least one function of the main camera.

8. A system comprising:
an aerial drone having a drone body that carries a main camera for capturing user-consumable image and/or video content;
a microphone incorporated in an aerial drone and configured to capture, at the drone during flight, an audio stream that includes speech by an operator of the drone;
an auxiliary camera mounted on the drone body to be movable relative to the drone body;
a camera controller configured to automatically and continuously direct the auxiliary camera toward the operator by movement of the camera relative to the drone body, thereby to capture a video stream that includes facial features of the operator, the video stream being synchronized with the audio stream, thus enabling continuous capturing of the video stream of the operator by the auxiliary camera while the main camera is directed at and capturing image and/or video content of a target separate from the operator;
one or more computer processors configured to identify, based at least in part on speech recognition processing of the audio stream and based at least in part on image processing of the video stream, a voice command issued by the operator with respect to operation of the drone; and
a drone controller configured to cause execution by the drone of one or more operations corresponding to the identified voice command.

9. The system of claim 8, wherein the audio stream includes a plurality of voice streams produced by different respective persons, the system further comprising:
a voice recognition engine configured to identify by automated voice recognition a particular one of the voice streams as an operator voice stream, wherein
the one or more computer processors are configured to perform the speech recognition processing and the voice command identification exclusively with respect to the operator voice stream.

10. The system of claim 9, wherein the voice recognition engine is configured such that the automated voice recognition comprises:
comparing the respective voice streams in the audio stream to a previously registered voice signature associated with the operator; and
identifying as the operator voice stream that one of the plurality of voice streams of that most closely corresponds to the voice signature.

11. The system of claim 9, wherein the voice recognition engine is configured to identify the operator voice stream based at least in part on relative loudness values for the respective voice streams in the audio stream, and automatically to identify a loudest one of the voice streams as the operator voice stream.

12. The system of claim 8, wherein:
the one or more computer processors are configured to identify occurrence of speech events by the operator by performing image processing with respect to the video stream, and to identify the voice command in the audio stream based at least in part on results of the image processing.

13. The system of claim 8, wherein the voice command and the one or more operations corresponding thereto are with respect to at least one function of the main camera incorporated in the drone.

14. A personal aerial drone comprising:
a drone body carrying flight systems for enabling controlled flight of the drone;
a microphone configured to capture an audio stream that includes speech by an operator of the drone;
a main camera mounted on the drone body for capturing user-consumable image and/or video content;
an auxiliary camera mounted on the drone body such as to be independently movable relative to the drone body;
a camera controller configured to automatically and continuously direct the auxiliary camera toward the operator by movement of the camera relative to the drone body, thereby to capture a video stream that includes facial features of the operator, the video stream being synchronized with the audio stream, thus enabling continuous capturing of the video stream of the operator by the auxiliary camera while the main camera is directed at and capturing image and/or video content of a target separate from the operator;
one or more computer processors configured to perform automated processing with respect to the audio stream and the video stream, to identify a voice command issued by the operator with respect to operation of the drone; and
a drone controller configured to cause execution by the drone of one or more operations corresponding to the identified voice command.

* * * * *